US 8,532,131 B2

(12) United States Patent
Honda

(10) Patent No.: US 8,532,131 B2
(45) Date of Patent: Sep. 10, 2013

(54) MULTIRATE COMMUNICATION APPARATUS AND METHOD OF CONTROLLING LINE-CONFIGURATION OF MULTIRATE COMMUNICATION APPARATUS

(75) Inventor: Takashi Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 12/720,046

(22) Filed: Mar. 9, 2010

(65) Prior Publication Data
US 2010/0158534 A1 Jun. 24, 2010

Related U.S. Application Data

(63) Continuation of application No. PCT/JP2007/068385, filed on Sep. 21, 2007.

(51) Int. Cl.
*H04L 29/06* (2006.01)

(52) U.S. Cl.
USPC ............................................. 370/419; 398/115

(58) Field of Classification Search
USPC .......................................... 370/419; 398/115
See application file for complete search history.

(56) References Cited

U.S. PATENT DOCUMENTS

| | | | |
|---|---|---|---|
| 4,763,319 A * | 8/1988 | Rozenblit | 370/397 |
| 6,795,506 B1 * | 9/2004 | Zhang et al. | 375/240.26 |
| 7,212,525 B2 | 5/2007 | Moriwaki et al. | |
| 2001/0003528 A1 | 6/2001 | Matsumura | |
| 2002/0191626 A1 | 12/2002 | Moriwaki et al. | |
| 2007/0248086 A1 * | 10/2007 | Petersen | 370/389 |

FOREIGN PATENT DOCUMENTS

| | | |
|---|---|---|
| EP | 1 091 529 A2 | 4/2001 |
| JP | 8-213994 | 8/1996 |
| JP | 10-224393 | 8/1998 |
| JP | 2001-168866 | 6/2001 |
| JP | 2001-186188 | 7/2001 |
| JP | 2003-8619 | 1/2003 |

OTHER PUBLICATIONS

International Search Report for PCT/JP2007/068385, mailed Dec. 25, 2007.
Japanese Office Action issued Jun. 7, 2011 in corresponding Japanese Patent Application 2009-533010.

* cited by examiner

*Primary Examiner* — Wei Zhao
(74) *Attorney, Agent, or Firm* — Staas & Halsey LLP

(57) ABSTRACT

There is provided the multirate communication apparatus including: an interface board to connect with a plurality of lines of different bit rates and processing transmission signals of the lines having a first line capacity; a port to mount a transmission module to transmit and receive the transmission signals; a line identifying unit to identify a line type of the transmission module mounted in the port; a plurality of signal processor to process transmission signals having a second line capacity obtained by dividing the first line capacity by a predetermined number; and a line-configuration controller to control a configuration of lines processed in respective the signal processor, based on an identification result of the line identifying unit; wherein the signal processor processes the transmission signals in accordance with the line type of the transmission module mounted in the port, base on a control by the line-configuration controller.

11 Claims, 20 Drawing Sheets

FIG. 5

| TYPE 0 | | PATTERN TYPE | | | |
|---|---|---|---|---|---|
| | | P01 | P02 | P03 | P04 |
| | OC-48 | 4 | 3 | 2 | 1 |
| | OC-12 | 0 | 0 | 3 | 0 |
| | OC-3 | 0 | 3 | 0 | 9 |
| NUMBER OF USED PORT | | 4 | 6 | 8 | 10 |
| NUMBER OF NON-USED PORT | | 8 | 6 | 4 | 2 |
| TOTAL NUMBER OF PORT | | 12 | 12 | 12 | 12 |
| NUMBER OF USED PORT | GROUP A | 1 | 1 | 1 | 1 |
| | GROUP B | 1 | 1 | 1 | 3 |
| | GROUP C | 1 | 1 | 3 | 3 |
| | GROUP D | 1 | 3 | 3 | 3 |

FIG. 7

| TYPE 1 | | PATTERN TYPE | | | |
|---|---|---|---|---|---|
| | | P11 | P12 | P13 | P14 |
| | OC-48 | 4 | 3 | 2 | 1 |
| | OC-12 | 0 | 0 | 4 | 0 |
| | OC-3 | 0 | 6 | 6 | 11 |
| NUMBER OF USED PORT | | 4 | 9 | 12 | 12 |
| NUMBER OF NON-USED PORT | | 8 | 3 | 0 | 0 |
| TOTAL NUMBER OF PORT | | 12 | 12 | 12 | 12 |
| NUMBER OF USED PORT | GROUP A | 1 | 1 | 1 | 1 |
| | GROUP B | 1 | 1 | 1 | 1 |
| | GROUP C | 1 | 1 | 4 | 4 |
| | GROUP D | 1 | 6 | 6 | 6 |

FIG. 9

| TYPE 2 | | PATTERN TYPE | | | |
|---|---|---|---|---|---|
| | | P21 | P22 | P23 | P24 |
| | OC-48 | 4 | 0 | 0 | 0 |
| | OC-12 | 0 | 12 | 4 | 1 |
| | OC-3 | 0 | 0 | 8 | 11 |
| NUMBER OF USED PORT | | 4 | 12 | 12 | 12 |
| NUMBER OF NON-USED PORT | | 8 | 0 | 0 | 0 |
| TOTAL NUMBER OF PORT | | 12 | 12 | 12 | 12 |
| NUMBER OF USED PORT | GROUP A | 1 | 4 | 4 | 4 |
| | GROUP B | 1 | 3 | 3 | 3 |
| | GROUP C | 1 | 3 | 3 | 3 |
| | GROUP D | 1 | 2 | 2 | 2 |

FIG. 11

| TYPE 3 | | PATTERN TYPE | | | |
|---|---|---|---|---|---|
| | | P31 | P32 | P33 | P34 |
| | OC-48 | 4 | 0 | 0 | 0 |
| | OC-12 | 0 | 8 | 4 | 0 |
| | OC-3 | 0 | 3 | 7 | 12 |
| NUMBER OF USED PORT | | 4 | 11 | 11 | 12 |
| NUMBER OF NON-USED PORT | | 8 | 1 | 1 | 0 |
| TOTAL NUMBER OF PORT | | 12 | 12 | 12 | 12 |
| NUMBER OF USED PORT | GROUP A | 1 | 4 | 4 | 5 |
| | GROUP B | 1 | 4 | 4 | 4 |
| | GROUP C | 1 | 2 | 2 | 2 |
| | GROUP D | 1 | 1 | 1 | 1 |

FIG. 13

| TYPE | PORT NUMBER | GROUP | INNER PORT NUMBER | SIGNAL PROCESSING CIRCUIT | | |
|---|---|---|---|---|---|---|
| 1 | 1 | A | A-1 | STS-48 | STS-12 | STS-3 |
| 1 | 2 | B | B-1 | STS-48 | STS-12 | STS-3 |
| 1 | 3 | C | C-1 | STS-48 | STS-12 | STS-3 |
| 1 | 4 | C | C-2 | | STS-12 | STS-3 |
| 1 | 5 | C | C-3 | | STS-12 | STS-3 |
| 1 | 6 | C | C-4 | | STS-12 | STS-3 |
| 1 | 7 | D | D-1 | STS-48 | STS-12 | STS-3 |
| 1 | 8 | D | D-2 | | STS-12 | STS-3 |
| 1 | 9 | D | D-3 | | STS-12 | STS-3 |
| 1 | 10 | D | D-4 | | STS-12 | STS-3 |
| 1 | 11 | D | D-5 | | | STS-3 |
| 1 | 12 | D | D-6 | | STS-12 | STS-3 |
| 2 | 1 | A | A-1 | STS-48 | STS-12 | STS-3 |
| 2 | 2 | A | A-2 | | STS-12 | STS-3 |
| 2 | 3 | A | A-3 | | STS-12 | STS-3 |
| 2 | 4 | A | A-4 | | STS-12 | STS-3 |
| 2 | 5 | B | B-1 | STS-48 | STS-12 | STS-3 |
| 2 | 6 | B | B-2 | | STS-12 | STS-3 |
| 2 | 7 | B | B-3 | | STS-12 | STS-3 |
| 2 | 8 | C | C-1 | STS-48 | STS-12 | STS-3 |
| 2 | 9 | C | C-2 | | STS-12 | STS-3 |
| 2 | 10 | C | C-3 | | STS-12 | STS-3 |
| 2 | 11 | D | D-1 | STS-48 | STS-12 | STS-3 |
| 2 | 12 | D | D-2 | | STS-12 | STS-3 |
| 3 | 1 | A | A-1 | STS-48 | STS-12 | STS-3 |
| 3 | 2 | A | A-2 | | STS-12 | STS-3 |
| 3 | 3 | A | A-3 | | STS-12 | STS-3 |
| 3 | 4 | A | A-4 | | STS-12 | STS-3 |
| 3 | 5 | A | A-5 | | STS-12 | STS-3 |
| 3 | 6 | B | B-1 | STS-48 | STS-12 | STS-3 |
| 3 | 7 | B | B-2 | | STS-12 | STS-3 |
| 3 | 8 | B | B-3 | | STS-12 | STS-3 |
| 3 | 9 | B | B-4 | | STS-12 | STS-3 |
| 3 | 10 | C | C-1 | STS-48 | STS-12 | STS-3 |
| 3 | 11 | C | C-2 | | | STS-3 |
| 3 | 12 | D | D-1 | STS-48 | STS-12 | STS-3 |

MULTIRATE COMMUNICATION APPARATUS AND METHOD OF CONTROLLING LINE-CONFIGURATION OF MULTIRATE COMMUNICATION APPARATUS

CROSS-REFERENCE TO RELATED APPLICATION

This is a continuation of Application PCT/JP2007/068385, filed on Sep. 21, 2007, the entire contents of which are incorporated herein by reference.

FIELD

The embodiments discussed herein are related to a multirate communication apparatus and a method of controlling line-configuration of the multirate communication apparatus. The multirate communication apparatus is one of a multi service provisioning platform (MSPP) apparatus that processes data of a plurality of types, such as synchronous optical network/synchronous digital hierarchy (SONET/SDH) data and Ethernet data.

BACKGROUND

Networks have been changed in that subscribers use broadband networks and services are diversified. Networks that transfer signals from various access networks accommodating subscriber lines have changed from SONET/SDH networks to Internet protocol (IP) networks. MSPP apparatuses corresponding to such diversified services have been developed.

In some cases, an MSPP apparatus is required to process signals transmitted using different protocols. As a solution for such a case, a technique is used in which a SONET/SDH frame is used and asynchronous transfer mode (ATM) signals, plesiochronous digital hierarchy (PDH) signals, and Ethernet signals are multiplexed in the payload section of the frame based on SONET/SDH (for example, refer to Japanese Laid-open Patent Publication No. 2001-186188).

There is a configuration of an MSPP apparatus including interface boards that individually interface with lines corresponding to respective services using, for example, SONET/SDH, Ethernet, and PDH, so as to provide multiservice. With such a configuration, in general, each of the interface boards is provided in advance with circuits (such as photoelectrical conversion circuits and signal termination circuits) that process signals corresponding to the bit rate of the lines accommodated. Therefore, in order to accommodate lines of a bit rate different from the lines having been accommodated after an apparatus is operated, it is necessary to replace the interface board.

Small form factor (SFF) and small form factor pluggable (SFP) which is a related technique to SFF have been developed to facilitate size reduction and standardization of transmission modules such as optical transceivers that transmit and receive signals (optical signals) from the above-mentioned access networks or the like. Communication device manufacturers and communication companies played a central role in establishing SFF in order to carry out size reduction and standardization of transmission modules. SFP has been established to produce pluggable transmission modules that conform to SFF.

Recently, transmission modules conforming to SFP are used in MSPP apparatuses, and thus, it is easy to change the bit rate of a line connected to a port of an interface board. Accordingly, there is an increasing need for an MSPP apparatus capable of mounting a transmission module conforming to SFP and accommodating lines of different bit rates in one port. The transmission modules mentioned hereinafter are transmission modules conforming to SFP.

SUMMARY

According to an aspect of the embodiment, there is provided a multirate communication apparatus including an interface board to connect with a plurality of lines of different bit rates and processing transmission signals of the lines having a first line capacity; a port to mount a transmission module to transmit and receive the transmission signals; a line identifying unit to identify a line type of the transmission module mounted in the port; a plurality of signal processor to process transmission signals having a second line capacity obtained by dividing the first line capacity by a predetermined number; and a line-configuration controller to control a configuration of lines processed in respective the signal processor, based on an identification result of the line identifying unit; wherein the signal processor processes the transmission signals in accordance with the line type of the transmission module mounted in the port, base on a control by the line-configuration controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating line accommodation for the Type 0 group configuration;

FIG. 7 is a diagram illustrating line accommodation for the Type 1 group configuration;

FIG. 9 is a diagram illustrating line accommodation for the Type 2 group configuration;

FIG. 11 is a diagram illustrating line accommodation for the Type 3 group configuration;

FIG. 13 is a diagram illustrating a database relating to a group configuration, included in a line-configuration controller;

DESCRIPTION OF EMBODIMENTS

Figure 1:
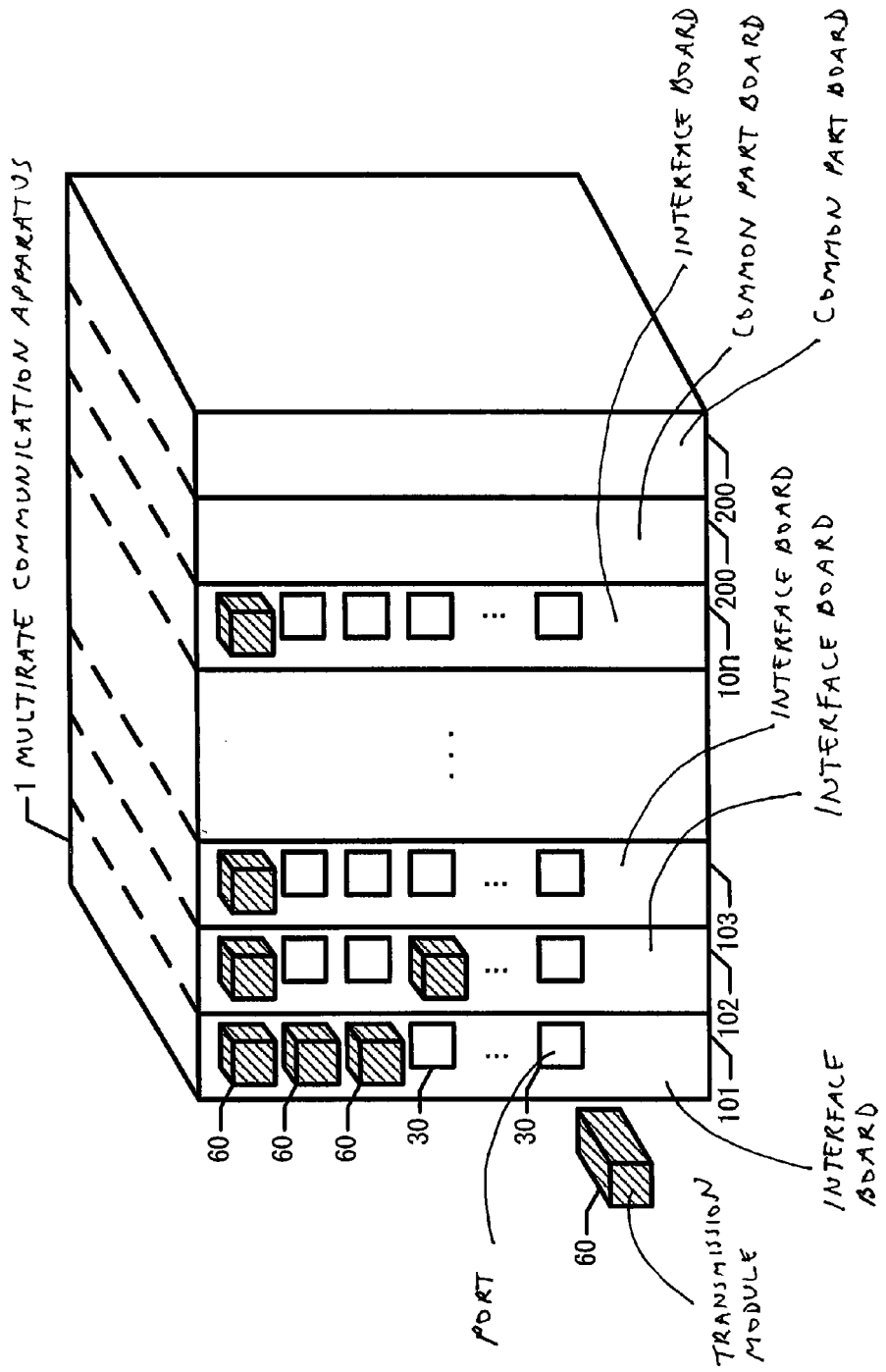
FIG. 1 is a diagram illustrating, in outline, a multirate communication apparatus.

An MSPP apparatus accommodated in a SONET/SDH network is required to be able to accommodate and process lines of different bit rates at one port. However, an interface board that includes a plurality of ports and processes a plurality of line signals has a limitation on the capacity of signals interfaced to other boards in the apparatus. In addition, a signal processor that is provided on the interface board and processes the line signals is required to include circuits that process line signals of a plurality of types. Furthermore, physical limitations on the interface board, for example, the limitation on the mounting area for a signal processor depending on the board size and the limitation on the number of ports that are mounted, cause limitations on the type and number of line signals to be accommodated in a signal processor that generates capacity-limited interface signals. There is also a limitation on the number of signal processors mounted on the interface board. Thus, for the capacity-limited signal processors mounted on the interface board, it becomes an issue to efficiently accommodate line capacity on the basis of the bit rate of the lines to be processed and the number of lines, and to cope with lines of different bit rates.

Details of embodiments will be described below with reference to the accompanying drawings. The same or similar components in the drawings will be represented by the same reference numerals.

FIG. 1 is a diagram illustrating, in outline, a multirate communication apparatus. Reference numeral 1 represents a multirate communication apparatus. For example, the multirate communication apparatus 1 has a shelf structure as the apparatus structure, and has a structure that allows a plurality of interface boards 101 to 10n (reference numeral 100 is used to represent the interface boards collectively), which accommodate lines and process transmission signals of the line (it may be referred to as line signals), and a common-part board 200, which processes various common signals of the apparatus, to be implemented. Although not illustrated in the drawings, a back wiring board that connects the signals from the interface board 100 and the common part board 200 is provided.

For example, the processing capability of the interface board 100 for processing line signals is equivalent to the line capacity of synchronous transport signal level 192 (STS-192), and four lines (4■ STS-48) of optical carrier level 48 (OC-48) each having a bit rate of 2.4 Gbps are accommodated. The line signals terminated at the interface board 100 are added and dropped at the common part board 200 in units of predetermined channels (for example, STS-1) and are transferred from the interface board 100. Since the number of signal lines connecting the common part board 200 and the interface board 100 and the signal rate are restricted, the interface board 100 is interfaced to the common part board 200 in STS-48 units via the back wiring board. Thus, the interface board 100 having a line capacity equivalent to STS-192 processes transmission signals using four signal processors in which a line capacity equivalent to STS-48 is set as a processor. The interface board 100 includes ports 30 that connect with the lines. The number of ports 30 that are mounted on the interface board 100 is limited on the basis of the size relationship between the interface board 100 and the ports 30. When the lines are connected to the port 30, transmission modules 60, which terminate the signals transmitted through the lines, are mounted on the ports 30. The transmission module 60 is a plug-in type and is mounted by being inserted into the port 30. Although transmission cables are connected to the transmission modules 60, these are not illustrated in the drawings. The opposite transmission apparatus and so on are connected via the transmission cables. Since the number of ports mounted on the interface board 100 is limited, the line capacity processed at the interface board 100 differs depending on the bit rate (line speed) of the transmission modules 60 mounted in the ports 30.

Typically, the interface board 100 includes a signal processing circuit that processes line signals corresponding to the bit rate (line speed) of the transmission module 60 mounted in the port 30. The four signal processors that each process the line capacity equivalent to STS-192 in line capacity units equivalent to STS-48 are equipped with signal processing circuits that correspond, in advance, to the type of the lines depending on the combinations of the type of the lines (for example, OC-48, OC-12, or OC-3) processed by the signal processor and number of lines (number of ports). In the interface board 100, the ports connecting with the lines processed by the four signal processors and the respective signal processors are grouped (Groups A, B, C, and D). Below, the combinations of the type and number of line processed by these groups will be referred to as group configurations.

First Embodiment

As an example of improving the accommodation efficiency of the line signals of the interface board 100, the bit rate (line speed) of the transmission module 60 mounted in the reference port among the plurality of ports 30 is detected, and a group configuration of the interface board 100 is selected from the types defined in advance (Types 1, 2, and 3, which will be described in detail below). Depending on the selected type, the line signals from the ports 30 are controlled such as to be connected to any one of the signal processors.

Figure 2:
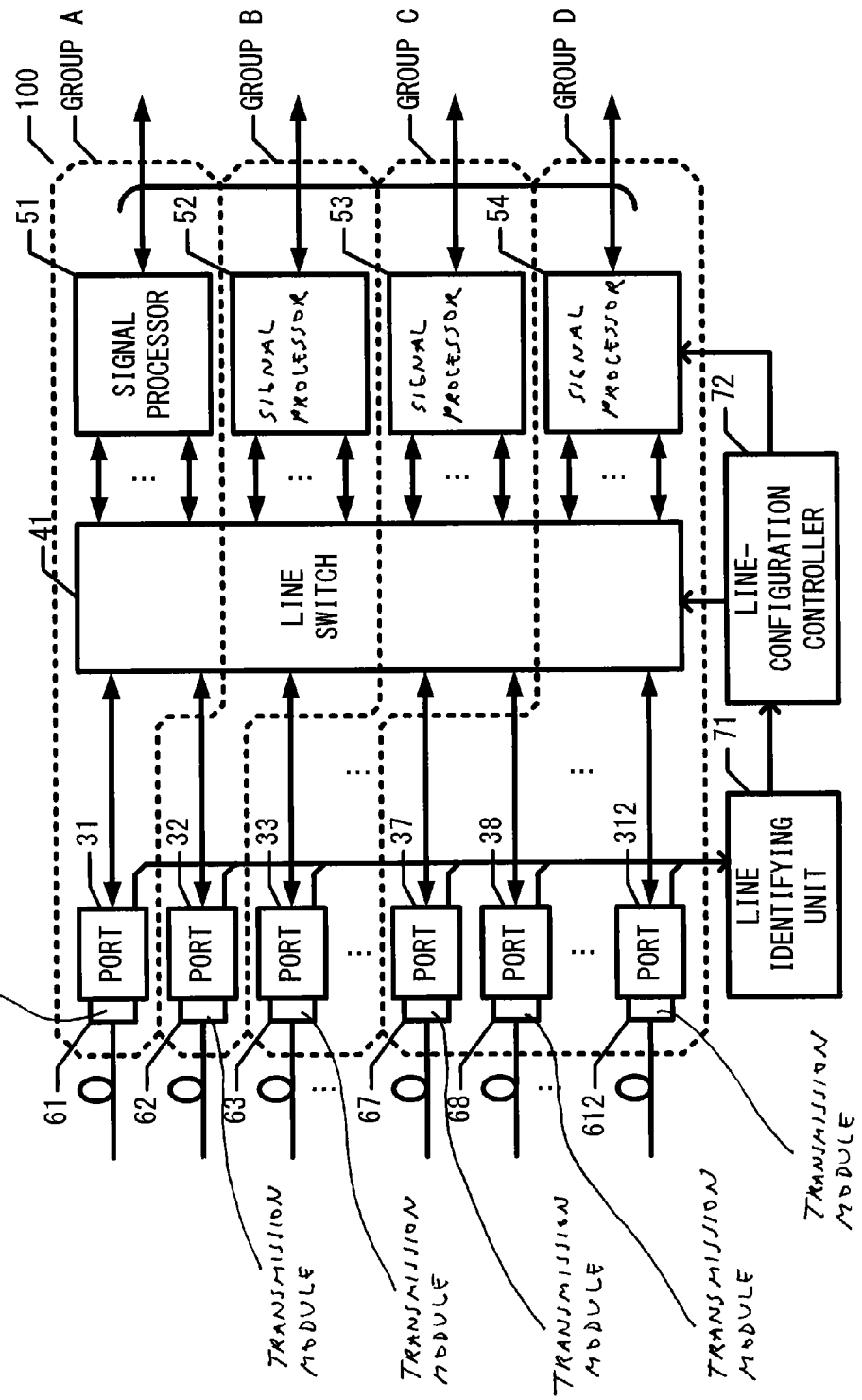
FIG. 2 is a diagram illustrating, in outline, an interface board.

FIG. 2 is a diagram illustrating, in outline, the interface board. Reference numerals 31 to 312 represent ports (reference numeral 30 is used to represent the ports collectively). Reference numeral 41 represents a line switch. Reference numerals 51 to 54 represent signal processors (reference numeral 50 is used to represent the signal processors collectively). Reference numerals 61 to 612 represent transmission modules (reference numeral 60 is used to represent the transmission modules collectively), and optical cables are connected to each transmission module. Reference numeral 71 represents a line identifying unit, and reference numeral 72 represents a line-configuration controller. The number of ports 30 and the number of signal processors 50 are determined on the basis of the function of the interface board 100 and are not limited to those in the embodiment.

The interface board 100 is capable of processing signals of, for example, a line capacity of STS-192. Then, according to the inter-board interface condition of the back wiring board of the multirate communication apparatus 1 and the condition of the signal processing of the common-part board 200, the interface board 100 divides the processing of the line capacity of STS-192 into four groups (Groups A, B, C, and D) according to the line capacity of STS-48, and processes the line signals equivalent to STS-48 at each of the signal processors 51, 52, 53, and 54.

FIG. 2 indicates the interface board 100 mounted on the multirate communication apparatus 1 in an operating state. Illustrated is a case in which the bit rate of the transmission module 61 mounted in the reference port (port 31) is detected, and Type 1 (which is described in detail below) is selected as the group configuration since the bit rate is determined as 2.4 Gbps. The relationships between the signal processors 51 to 54 and the ports 31 to 312 in Type 1 are indicated as Groups A, B, C, and D. Groups A, B, C, and D are, respectively, a group of ports 31 accommodating the line signals processed by the signal processor 51, a group of ports 32 accommodating the line signals processed by the signal processor 52, a group of ports 33 to 36 (not illustrated) accommodating the line signals processed by the signal processor 53, and a group of ports 37 to 312 accommodating the line signals processed by the signal processor 54.

The line identifying unit 71 determines the type, for example, bit rate, of the transmission module mounted in the port 30. Product identification information, which is referred to as a physical inventory, such as the product name, product figure number, manufacturer's number, of the transmission module is stored in the transmission module 60. The line identifying unit 71 identifies the type of the transmission module by reading out the physical inventory of the transmission module 60.

The line-configuration controller 72 selects the group configuration of the interface board 100 among the types (Types 1, 2, or 3) provided in advance on the basis of the type of the transmission module 61 mounted in the reference port, for example, port 31. The line switch 41 is controlled according to the selected type in order to configure the ports assigned to the group. On the basis of the type (bit rate) of the transmission module identified by the line identifying unit 71, the signal processing circuit of the signal processor 50 is controlled to be adapted to the type of the transmission module mounted in the corresponding port. For example, if the bit rate of the transmission module 61 of the port 31 is 2.4 Gbps (OC-48), the line-configuration controller 72 controls the signal processor 51 such that the signal from the port 31 transmitted via the line switch 41 is processed at the STS-48 signal processing circuit. Since the bit rate of the transmission module 61 of the port 31 is, 2.4 Gbps (OC-48), control is carried out such that Type 1 is selected for the group configuration (which will be described in detail below), and port 31 is assigned to Group A, port 32 to Group B, ports 33 (to 36) to Group C, and ports 37 to 312 to Group D. The signal processor 51 of Group A, the signal processor 52 of Group B, the signal processor 53 of Group C, and the signal processor 54 of Group D each process signals of a line capacity equivalent to STS-48.

Furthermore, to describe the interface board 100, the type of the line accommodated in the port 30 is presumed to be as follows. (Details will be described below. The presumed case, however, is that the group configuration is Pattern P13 in FIG. 7.) In other words, OC-48 is accommodated in Groups A and B respectively, OC-12 is accommodated in Group C, and OC-3 is accommodated in Group D, respectively. The transmission module 61 mounted in the port 31 converts the received OC-48 optical signals to STS-48 electric signals at the transmission module 61. The line switching circuit 41 connects the STS-48 signals from the transmission module 61 to the signal processor 51 on the basis of the control by the line-configuration controller 72 corresponding to the above-described Type 1. STS-48 signals are terminated at the signal processing circuit for STS-48, which is included in the signal processor 51, and are transferred to another board via the back wiring board. Also for the transmission module 62 mounted in the port 32, the received OC-48 optical signals are converted to STS-48 electric signals at the transmission module 62 and, via the line switching circuit 41, are terminated at the signal processing circuit for STS-48 included in the signal processor 52. The OC-12 optical signals received at the transmission module 63 mounted in the port 33 are converted to STS-12 electric signals at the transmission module 63 and, via the circuit switch 41, terminated at the signal processing circuit for STS-12 included in the signal processor 53. The OC-3 optical signals received at the transmission module 67 mounted in the port 37 are converted to STS-3 electric signals at the transmission module 67 and are terminated at the signal processing circuit for STS-3, which is included in the signal processor 54, via the circuit switch 41.

Figure 3:
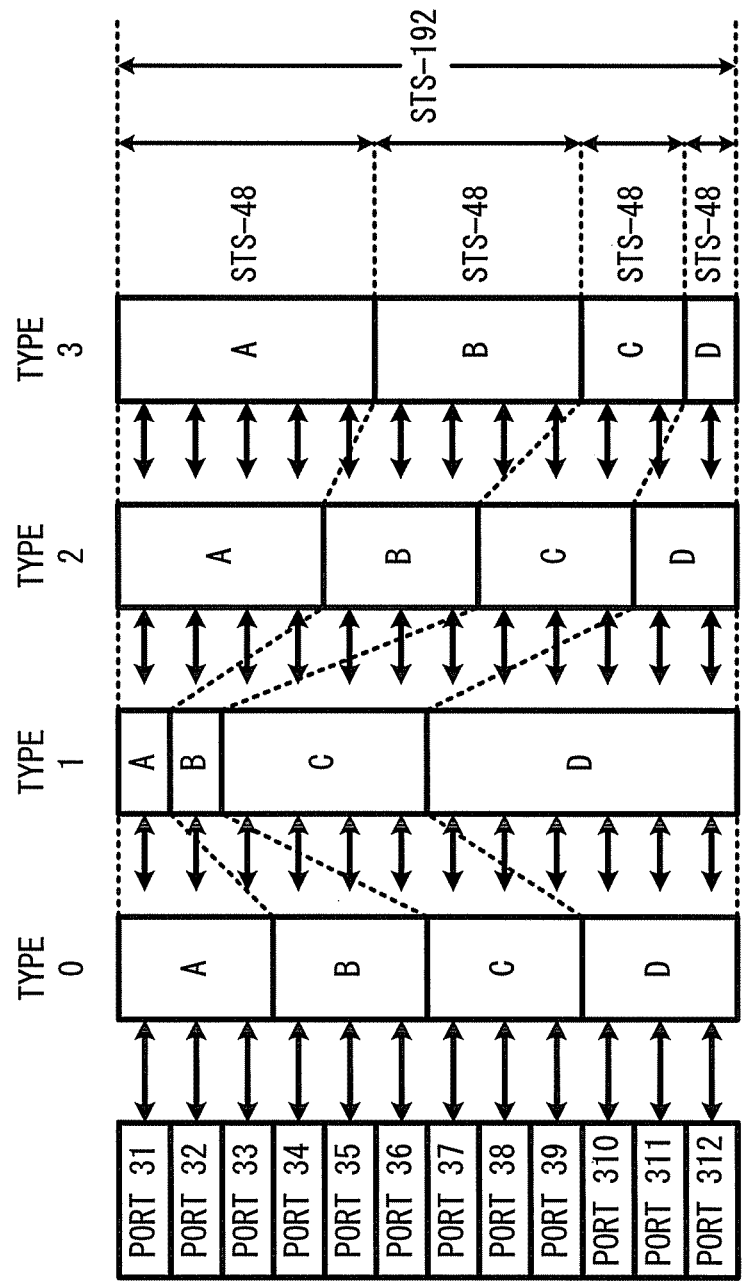
FIG. 3 is a diagram illustrating group configurations.

FIG. 3 is a diagram illustrating the group configurations.

At the interface board 100, the number and signal speed of the signals interfacing another board (e.g., the common board 200 illustrated in FIG. 1) are limited. Consequently, at the signal processor 50 that generates these interface signals, the signal processing capacity is limited. For example, when a line capacity equivalent to STS-192 is processed at one interface board 100, four signal processors 50 that process a line capacity equivalent to STS-48 are provided. In this case, one signal processor 50 is capable of processing a maximum line capacity that is equivalent to STS-48. Thus, if the lines processed at the signal processor 50 are STS-48, only one line is accommodated; if the line is STS-12, four lines are accommodated; and if the line is STS-3, 16 lines are accommodated. However, the limited number of ports 30 to be mounted causes the number of lines processed at the signal processor 50 to also be limited.

At one interface board 100, when a plurality of line types (for example, OC-48, C-12, and OC-3) is accommodated, the combinations of the type and number of lines processed at the signal processor 50 are set in advance, and the signal processor 50 is provided with signal processing circuits capable of processing the respective type and number of lines.

The group configuration in which the combinations of the type and number of lines processed at the signal processor 50 is defined as one group will be described below.

For example, the interface board 100 is capable of processing a signal having a line capacity of STS-192 and processes line signals equivalent to STS-48 with the signal processor 50, which divides the signal into four groups (Groups A, B, C, and D) in STS-48 units.

The interface board 100 has, for example, twelve ports 30, which are referred to as ports 31 to 312 (31, 32, 33, -, 38, 39, 310, 311, and 312).

As for the group configuration of the interface board 100, four types, i.e., Type 0, Type 1, Type 2, and Type 3, will be described.

Type 0 processes the signals of the ports 31 to 33, the ports 34 to 36, the ports 37 to 39, and the ports 310 to 312 in Groups A, B, C, and D, respectively.

Type 1 processes the signals of the port 31, the port 32, the ports 33 to 36, and the ports 37 to 312 in Groups A, B, C, and D, respectively.

Type 2 processes the signals of the ports 31 to 34, the ports 35 to 37, the ports 38 to 310, and the ports 311 and 312 in Groups A, B, C, and D, respectively.

Type 3 processes the signals of the ports 31 to 35, the ports 36 to 39, the ports 310 and 311, and the port 312 in Groups A, B, C, and D, respectively.

Figure 4:
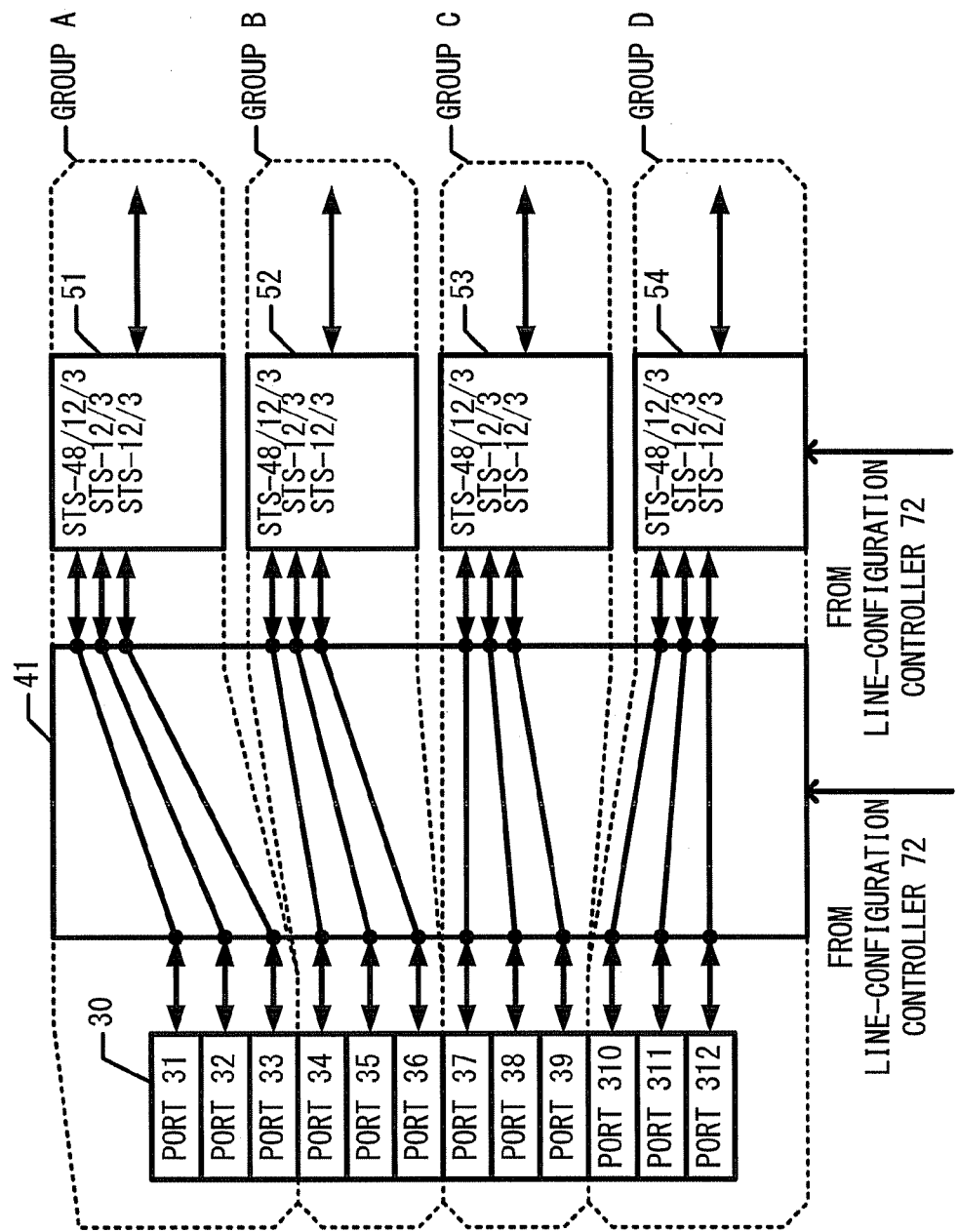
FIG. 4 is a diagram illustrating, in outline, a Type 0 group configuration.

FIG. 4 is a diagram illustrating, in outline, the Type 0 group configuration. The circuit switch 41 is controlled by the line-configuration controller 72 such that the signals via the ports 31 to 33 are connected to the signal processor 51, the signals via the ports 34 to 36 are connected to the signal processor 52, the signals via the ports 37 to 39 are connected to the signal processor 53, and the signals via the ports 310 to 312 are connected to the signal processor 54.

Each of the signal processors 51 to 54 includes a signal processing circuit that enables processing of any one of STS-48, STS-12, and STS-3 and a signal processing circuit that enables processing of either STS-12 or STS-3, with control of the line-configuration controller 72.

FIG. 5 is a diagram illustrating the line accommodation of the Type 0 group configuration. For the combinations of the lines, e.g., the three types, i.e., OC-48, OC-12, and OC-3, that are processed in the interface board 100, patterns of pattern types P01 to P04 are set in advance, and the state of the ports of the patterns is illustrated.

P01 is a pattern in which OC-48 is accommodated in each of Groups A to D. Since the line processing capacity of the signal processor 50 is OC-48, one port in each of Groups A to D is used.

P02 is a pattern in which OC-48 is accommodated in each of Groups A to C, and OC-3 is accommodated in Group D. One port in each of Groups A to C is used to accommodate OC-48, and three ports in Group D are used to accommodate OC-3.

P03 is a case in which OC-48 is accommodated in each of Groups A and B, OC-12 is accommodated in Group C, and OC-3 is accommodated in Group D. One port in each of Groups A and B is used to accommodate OC-48; three ports in Group C are used to accommodate OC-12; and three ports in Group D are used to accommodate OC-3.

P04 is a case in which OC-48 is accommodated in Group A, and OC-3 is accommodated in each of Groups B to D. One port in Group A is used to accommodate OC-48, and three ports in each of Groups B to D are used to accommodate OC-3.

Therefore, as for P02 to P04, according to Type 0, a single group is only able to accommodate a maximum of three lines of OC-12 or OC-3, thus preventing the maximum use of the processing ability of the signal processor 50. Therefore, in this embodiment, Types 1 to 3 are used.

Figure 6:
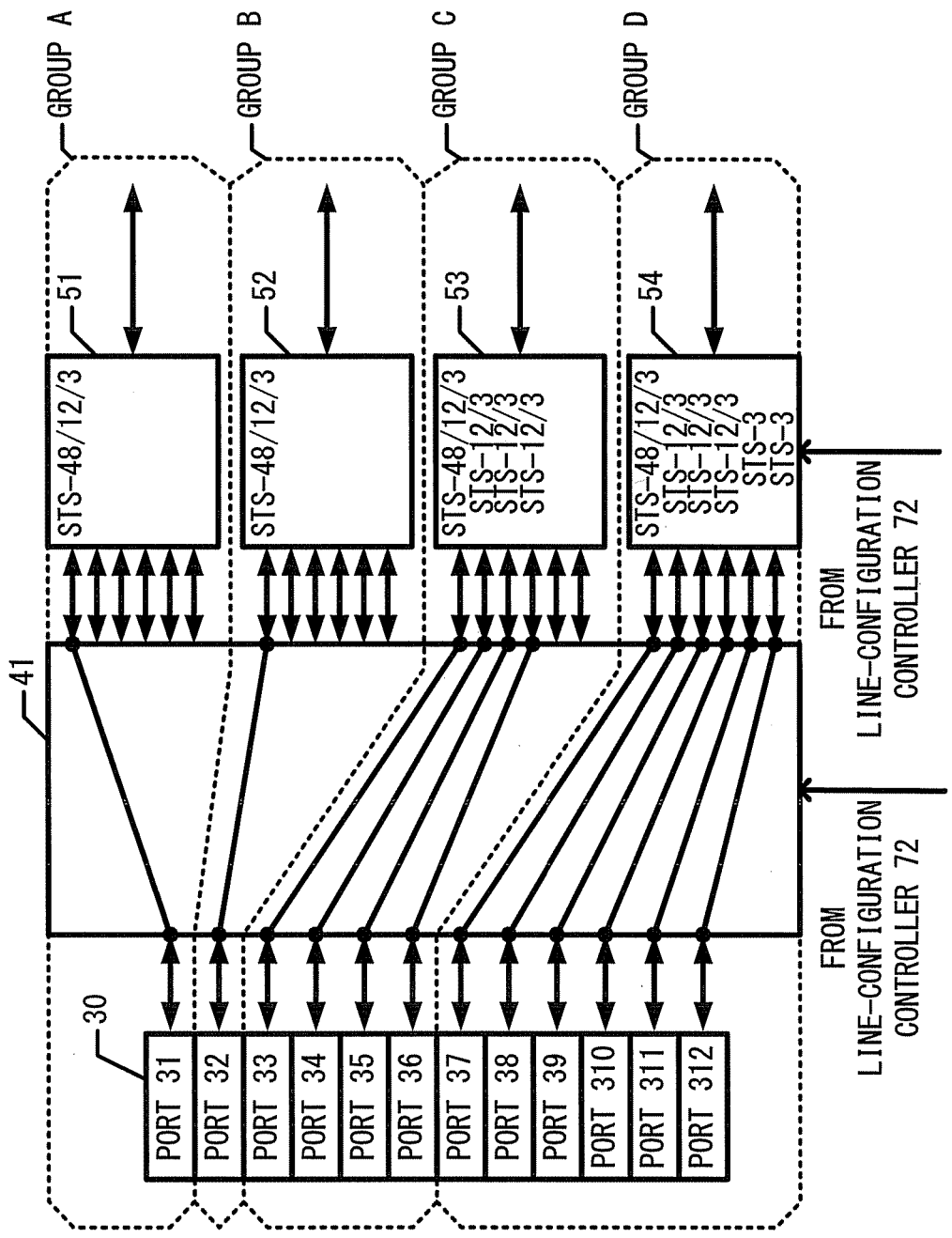
FIG. 6 is a diagram illustrating, in outline, a Type 1 group configuration.

FIG. 6 is a diagram illustrating, in outline, the Type 1 group configuration. The line switch 41 is controlled by the line-configuration controller 72 to connect the signals via the port 31 to the signal processor 51, to connect the signals via the port 32 to the signal processor 52, to connect the signals via the ports 33 to 36 to the signal processor 53, to connect the signals via the ports 37 to 312 to the signal processor 54.

Each of the signal processors 51 and 52 includes a signal processing circuit that is capable of processing any one of STS-48, STS-12, and STS-3 with the control of the line-configuration controller 72; the signal processor 53 includes a signal processing circuit that is capable of processing one of STS-48, STS-12, and STS-3 and a signal processing circuit that is capable of processing either STS-12 or STS-3, with the control of the line-configuration controller 72; the signal processor 54 includes a signal processing circuit that is capable of processing any one of STS-48, STS-12, and STS-3, a signal processing circuit that is capable of processing either STS-12 or STS-3, and a signal processing circuit that is capable of processing STS-3 with the control of the line-configuration controller 72.

FIG. 7 is a diagram illustrating the line accommodation of the Type 1 group configuration. Pattern types P11 to P14 are set in advance as patterns for the combinations of the lines, for example, three line types, i.e., OC-48, OC-12, and OC-3, processed in the interface board 100, and the state of the ports of each pattern is illustrated.

P11 is a pattern in which OC-48 is accommodated in each of Groups A to D. Since the line processing capacity of the signal processor 50 is OC-48, one port in each of Groups A to D is used.

P12 is a pattern in which OC-48 is accommodated in each of Groups A to C, and OC-3 is accommodated in Group D. One port in each of Groups A to C is used to accommodate OC-48, and six ports in Group D are used to accommodate OC-3.

P13 is a case in which OC-48 is accommodated in each of Groups A and B, OC-12 is accommodated in Group C, and OC-3 is accommodated in Group D. One port in each of Groups A and B is used to accommodate OC-48; four ports in Group C are used to accommodate OC-12; and six ports in Group D are used to accommodate OC-3.

P14 is a pattern in which OC-48 is accommodated in Group A, and OC-3 is accommodated in each of Groups B to D. One port in Group A is used to accommodate OC-48, and a total of 11 ports in Groups B to D is used to accommodate OC-3.

Accordingly, Type 1 is a useful configuration when it is presumed that OC-48 is accommodated in the port 31 or the ports 31 and 32.

Figure 8:
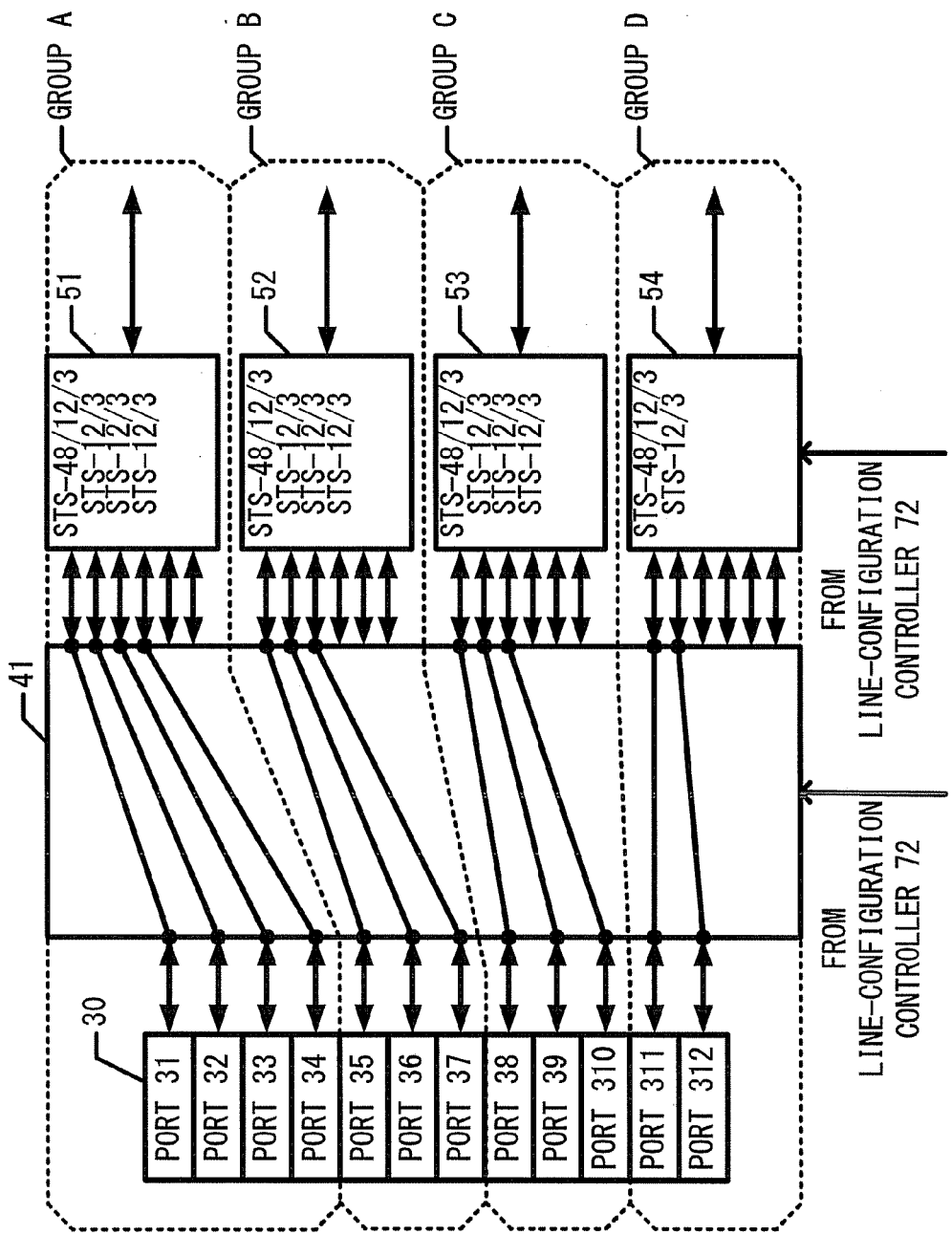
FIG. 8 is a diagram illustrating, in outline, a Type 2 group configuration.

FIG. 8 is a diagram illustrating, in outline, the Type 2 group configuration. The line switch 41 is controlled by the line-configuration controller 72 to connect the signals via the ports 31 to 34 to the signal processor 51, to connect the signals via the ports 35 to 37 to the signal processor 52, to connect the signals via the ports 38 to 310 to the signal processor 53, to connect the signals via the ports 311 and 312 to the signal processor 54.

Each of the signal processors 51 to 54 includes a signal processing circuit that is capable of processing any one of STS-48, STS-12, and STS-3 and a signal processing circuit that is capable of processing either STS-12 or STS-3, with the control of the line-configuration controller 72.

FIG. 9 is a diagram illustrating the line accommodation of the Type 2 group configuration. Pattern types P21 to P24 are set in advance as patterns for the combinations of the lines, for example, three line types, i.e., OC-48, OC-12, an OC-3, processed in the interface board 100 and the state of the ports is illustrated.

P21 is a pattern in which OC-48 is accommodated in each of Groups A to D. Since the line processing capacity of the signal processor 50 is OC-48, one port in each of Groups A to D is used.

P22 is a pattern in which OC-12 is accommodated in each of Groups A to D. Four ports in each of Group A are used to accommodate OC-12; three ports in each of Groups B and C are used to accommodate OC-12; and two ports in Group D are used to accommodate OC-12.

P23 is a pattern in which OC-12 is accommodated in Group A, an OC-3 is accommodated in each of Groups B to D. Four ports in Group A are used to accommodate OC-12; three ports in each of Groups B and C are used to accommodate OC-3; and two ports in Group D are used to accommodate OC-3.

P24 is a pattern in which OC-12 and OC-3 are accommodated in Group A, and OC-3 is accommodated in each of Groups B to D. One port in Group A is used to accommodate OC-12, and a total of 11 ports in Groups A to D are used to accommodate OC-3.

Accordingly, Type 2 is a useful configuration when it is presumed that OC-12 is accommodated in the port 31, and OC-12 or OC-3 is accommodated in other ports.

Figure 10:
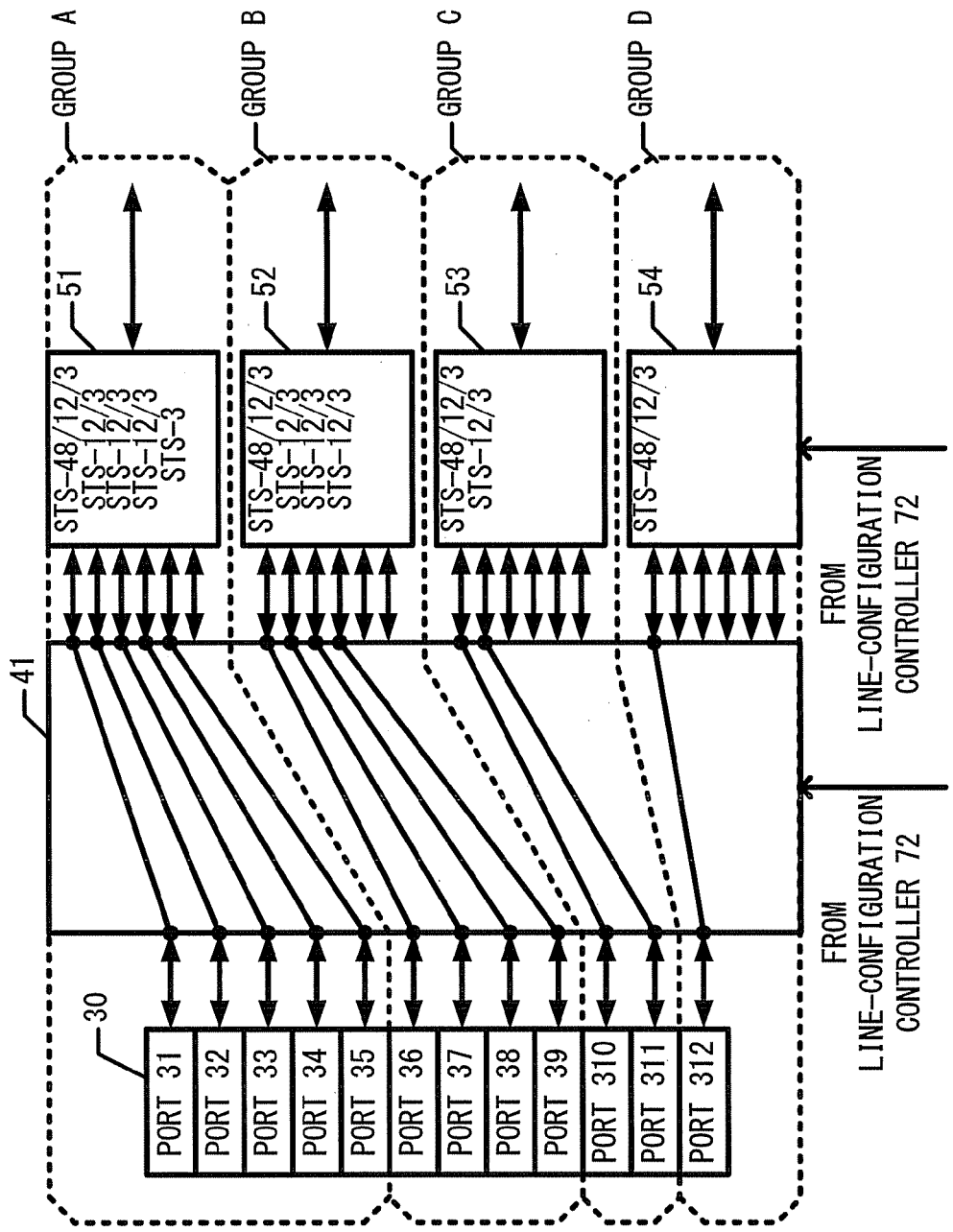
FIG. 10 is a diagram illustrating, in outline, a Type 3 group configuration.

FIG. 10 is a diagram illustrating, in outline, the Type 3 group configuration. The line switch 41 is controlled by the line-configuration controller 72 to connect the signals via the ports 31 to 35 to the signal processor 51, to connect the signals via the ports 36 to 39 to the signal processor 52, to connect the signals via the ports 310 and 311 to the signal processor 53, to connect the signals via the port 312 to the signal processor 54.

The signal processor 51 includes a signal processing circuit that is capable of processing any one of STS-48, STS-12, and STS-3, a signal processing circuit that is capable of processing either STS-12 or STS-3, and signal processing circuit that is capable of processing STS-3, with the control of the line-configuration controller 72; each of the signal processors 52 and 53 includes a signal processing circuit that is capable of processing any one of STS-48, STS-12, and STS-3 and a signal processing circuit that is capable of processing either STS-12 or STS-3, with the control of the line-configuration controller 72; and the signal processor 54 includes a signal processing circuit that is capable of processing any one of STS-48, STS-12, and STS-3, with the control of the line-configuration controller 72.

FIG. 11 is a diagram illustrating the line accommodation of the Type 3 group configuration. Pattern types P31 to P34 are set in advance as patterns for the combinations of the lines, for example, three line types, i.e., OC-48, OC-12, an OC-3, processed in the interface board 100, and the state of the ports is illustrated.

P31 is a pattern in which OC-48 is accommodated in each of Groups A to D. Since the line processing capacity of the signal processor 50 is OC-48, one port in each of Groups A to D is used.

P32 is a case in which OC-12 is accommodated in each of Groups A and B, and OC-3 is accommodated in each of Groups C and D. Four ports in each of Groups A and B are used to accommodate OC-12; two ports in Group C are used to accommodate OC-3; and one port in Group D is used to accommodate OC-3.

P33 is a pattern in which OC-12 is accommodated in Group A, and OC-3 is accommodated in each of Groups B to D. Four ports in Group A are used to accommodate OC-12; four ports in Group B are used to accommodate OC-3; two ports in Group C are used to accommodate OC-3; and one port is used to accommodate OC-3 for Group D.

P34 is a pattern in which OC-3 is accommodated in each of Groups A to D. All ports in Groups A to D are used to accommodate OC-3.

Accordingly, Type 3 is a useful configuration when it is presumed that OC-3 is accommodated in the port 31, and OC-3 and OC-12 are mixed, with a larger proportion of OC-3.

As described above, by changing the group configuration of the interface board 100 depending on the type of the lines accommodated in the interface board 100, efficiency may be improved in the aspects of the line capacity processed at the interface board and the number of lines accommodated in the interface board 100.

Therefore, in order for the configurations of the signal processors 50 to correspond to Types 1 to 3, the signal processor 51 has the configuration of the signal processor 51 illustrated in FIG. 10, the signal processor 52 has the configuration of the signal processor 52 illustrated in FIG. 10, the signal processor 53 has the configuration of the signal processor 53 illustrated in FIG. 6, and the signal processor 54 has the configuration of the signal processor 54 illustrated in FIG. 6.

Figure 12:
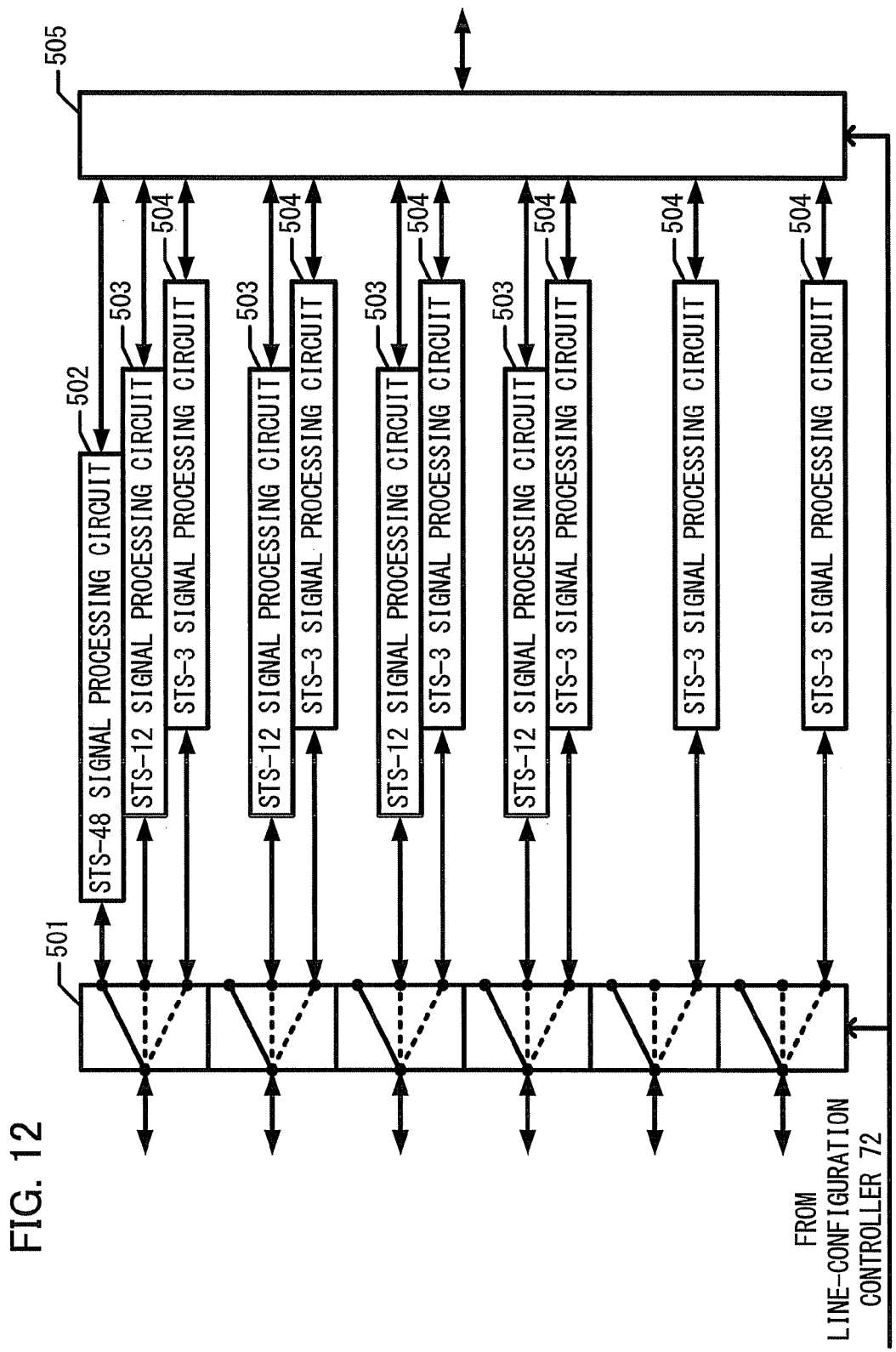
FIG. 12 is a diagram illustrating, in outline, a signal processor.

FIG. 12 is a diagram illustrating, in outline, the signal processor. The configuration of the signal processor 54 illustrated in FIG. 6 is provided for description.

Reference numeral 501 represents an STS-48/12/3 selecting circuit. Reference numeral 502 represents an STS-48 signal processing circuit, reference numeral 503 represents an STS-12 signal processing circuit, and reference numeral 504 represents an STS-3 signal processing circuit. Reference numeral 505 represents a signal multiple-separation circuit.

The STS-48/12/3 selecting circuit 501 selects, on the basis of the control of the line-configuration controller 72, the circuit to process the line signals transmitted and received at the port 30.

The STS-48 signal processing circuit 502 terminates the signal of STS-48. The STS-12 signal processing circuit 503 terminates the STS-12 signals. The STS-3 signal processing circuit 504 terminates the STS-3 signals.

The signal multiple-separation circuit 505 carries out, on the basis of the control of the line-configuration controller 72, multiple processing and separation processing of STS-48, STS-12, and STS-3 signals.

As the configuration of the signal processor 50, a circuit that commonly processes the line signals of any one of STS-48/12/3 is provided, and it is possible to provide means for terminating the line signals of any one of STS-48/12/3 and for carrying out multiple separation of the line signals, on the basis of the control of the line-configuration controller 72.

FIG. 13 is a diagram illustrating a database relating to the group configuration, included in the line-configuration controller 72. This is a database of the port numbers associated with Types 1, 2, and 3 of the group configurations illustrated in FIGS. 6 to 11, group symbols representing the groups to which the ports belong, and information related to the signal processing circuits processing signals of lines that are possibly accommodated in the ports.

The line-configuration controller 72 controls, with reference to the database, the line switch 41 and the signal processor 50 in accordance with the type of the transmission module 60 mounted in the port 30.

For example, when the group configuration is set to Type 1, the lines accommodated in the port having the port number 1 is any one of OC-48, OC-12, and OC-3, and thus the line-configuration controller 72 selects the signal processing circuit in accordance with the type (bit rate) of the transmission module 60 mounted in the port having the port number 1. For example, when the group configuration is set to Type 2, the lines accommodated in the port having the port number 6 is either OC-12 or OC-3, and thus the line-configuration controller 72 selects the signal processing circuit in accordance with the type (bit rate) of the transmission module 60 mounted in the port having the port number 6.

Figure 14:
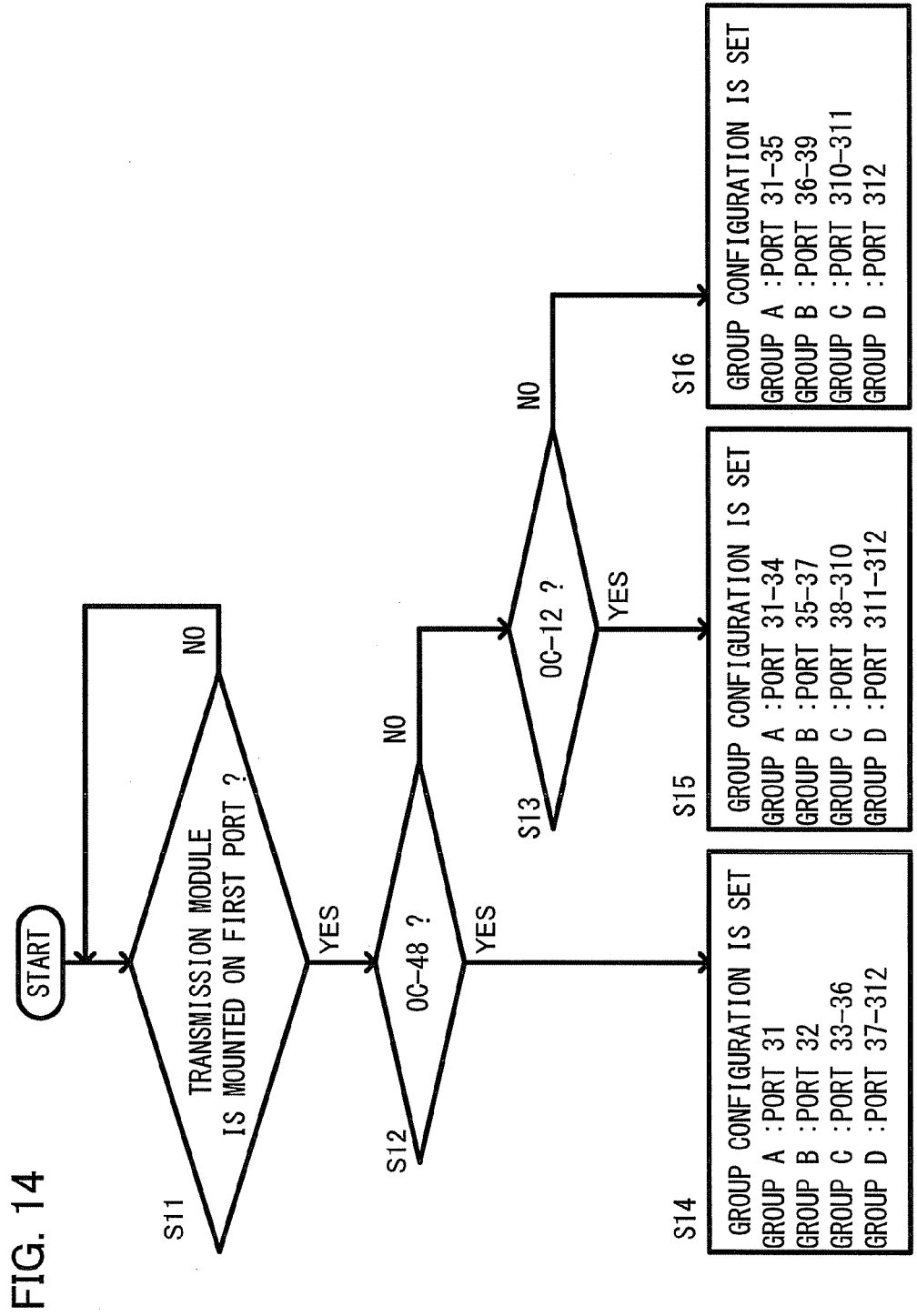
FIG. 14 is a diagram illustrating a setting flow of the group configuration.

FIG. 14 is a diagram illustrating the setting flow of the group configuration. A reference port is provided in advance in the ports 30 on the interface board 100, and the group configuration is set on the basis of the type (bit rate) of the transmission module 60 mounted in the reference port. Here, the reference port is referred to as a first port (port 31).

S11. The line identifying unit 71, illustrated in FIG. 2, monitors whether or not the transmission module 60 is mounted in the first port on the basis of the information on the physical inventory read out from the transmission module 60. When the transmission module 60 is mounted, Step S12 is carried out.

S12. The line identifying unit 71 determines whether or not the line type of the transmission module 60 mounted in the first port is OC-48 on the basis of the information on the physical inventory read out from the transmission module 60. When it is OC-48, Step S14 is carried out, whereas, when it is not OC-48, Step S13 is carried out.

S13. The line identifying unit 71 determines whether or not the line type of the transmission module 60 mounted in the first port is OC-12 on the basis of the information on the physical inventory read out from the transmission module 60.

When it is OC-12, Step S15 is carried out, whereas, when it is not OC-12, i.e., when it is OC-3, Step S16 is carried out.

S14. The line-configuration controller 72, illustrated in FIG. 2, determines that the line accommodated in the transmission module mounted in the first port is OC-48 on the basis of the information sent from the line identifying unit 71. Consequently, the line-configuration controller 72 selects the Type 1 group configuration and controls the line switch 41, as illustrated in FIG. 6, on the basis of the database illustrated in FIG. 13, such as to connect the signals via the port 31 to the signal processor 51, to connect the signals via the port 32 to the signal processor 52, to connect the signals via the ports 33 to 36 to the signal processor 53, and to connect the signals via the ports 37 to 312 to the signal processor 54.

In Step S14, the line-configuration controller 72 controls the signal processor 50, as illustrated in FIG. 12, on the basis of the information (bit rate) of the type of the transmission module mounted in each port sent from the line identifying unit 71 such as to connect the signals via the port to the signal processing circuit corresponding to the bit rate.

S15. The line-configuration controller 72 determines that the line accommodated in the transmission module mounted in the first port is OC-12 on the basis of the information sent from the line identifying unit 71. Consequently, the line-configuration controller 72 selects the Type 2 group configuration and controls the line switch 41, as illustrated in FIG. 8, on the basis of the database illustrated in FIG. 13, such as to connect the signals via the ports 31 to 34 to the signal processor 51, to connect the signals via the ports 35 to 37 to the signal processor 52, to connect the signals via the ports 38 to 310 to the signal processor 53, and to connect the signals via the ports 311 and 312 to the signal processor 54.

In Step S15, the line-configuration controller 72 controls the signal processor 50, as illustrated in FIG. 12, on the basis of the information (bit rate) of the type of the transmission module mounted in each port sent from the line identifying unit 71 such as to connect the signals via the port to the signal processing circuit corresponding to the bit rate.

S16. The line-configuration controller 72 determines that the line accommodated in the transmission module mounted in the first port is OC-3 on the basis of the information sent from the line identifying unit 71. Consequently, the line-configuration controller 72 selects the Type 3 group configuration and controls the line switch 41, as illustrated in FIG. 10, on the basis of the database illustrated in FIG. 13, such as to connect the signals via the ports 31 to 35 to the signal processor 51, to connect the signals via the ports 36 to 39 to the signal processor 52, to connect the signals via the ports 310 and 311 to the signal processor 53, and to connect the signals via the port 312 to the signal processor 54.

In Step S16, the line-configuration controller 72 controls the signal processor 50, as illustrated in FIG. 12, on the basis of the information (bit rate) of the type of the transmission module mounted in each port sent from the line identifying unit 71 such as to connect the signals via the ports to the signal processing circuits corresponding to the bit rate.

According to this embodiment, it is possible to accommodate lines of different types in one port, and it is possible to set the group configuration to which the port belongs according to the type (bit rate) of the lines accommodated in the reference port among the ports provided on the interface board. Consequently, the line capacity processed at the interface board may be improved.

In the above-described embodiment, the number of ports (for example, 12) provided on the interface board, a first line capacity (for example, equivalent to STS-192) accommodated and processed in the interface board, the number of groups (for example, four) that process the line signals of a second line capacity (for example, equivalent to STS-48) obtained by dividing the first line capacity, and the number of ports belonging to each group are determined by the size of the circuits installed on the interface board, the signal processing architecture (interface condition between the interface board and the common board, etc.) of the multirate communication apparatus accommodating the interface board. It is possible, however, to apply the above-described multirate communication apparatus and the method of controlling the line-configuration of the multirate communication apparatus.

Second Embodiment

In FIG. 1, depending on the use of the multirate communication apparatus 1, the type of the interface board 100 mounted on this apparatus differs. For example, when used for a high-speed network to which OC-192, etc., is transmitted, there is a tendency in which the lines of the OC-192 are accommodated in the interface board 100, which accommodates the lines of the high-speed network, and many relatively high-speed lines, such as OC-48, are used as the lines accommodated in the other interface boards 100. When used for an intermediate/low speed network to which OC-48 is transmitted, there is a tendency in which the lines of OC-192 are not accommodated in the interface board 100, and may relatively low-speed lines, such as OC-12 and OC-3, are used as the lines accommodated in the interface board 100. Thus, the slot in which the interface board 100 that is capable of identifying the characteristics of such use of the multirate communication apparatus 1 is installed is set as a reference slot.

In this embodiment, the capacity of the lines accommodated in the interface board 100 may be increased by setting the reference slot to the slot in which the interface board 100 is installed, and adding a condition for setting the group configuration in accordance with the type of the lines installed in the reference slot.

Figure 15:
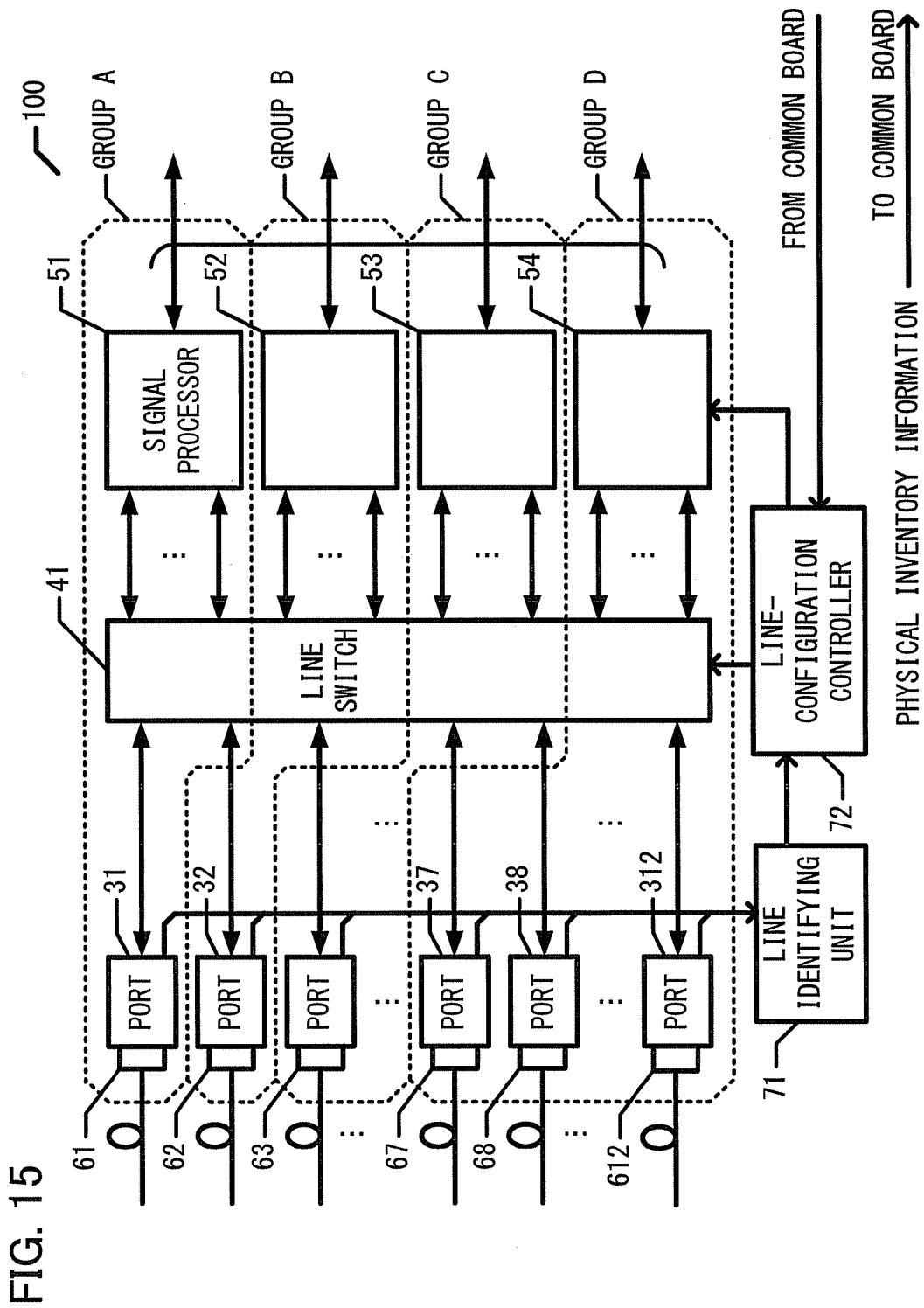
FIG. 15 is a diagram (2) illustrating, in outline, an interface board.

FIG. 15 is a diagram (2) illustrating, in outline, an interface board. Similar FIG. 2, the interface board 100 mounted on the multirate communication apparatus 1 in an operating state is illustrated. The transmission modules 61, 62, and 63 to 612 are mounted in the ports 31, 32, and 33 to 312, respectively, of the interface board 100 and are operated. Furthermore, the functions described below are added to the line-configuration controller 72 of the interface board 100, illustrated in FIG. 2.

The interface board 100 in FIG. 15 sends the physical inventory information of the interface board 100 to the common board 20. The line-configuration controller 72 in FIG. 15 receives from the common board 20 the line information of the interface board 100 installed in the reference slot, and carries out setting control for the group configuration.

The common board 20 receives the physical inventory information from the interface board 100 installed in the common slot, and sends the line information of the interface board 100 installed in the common slot to each interface board 100.

Figure 16:
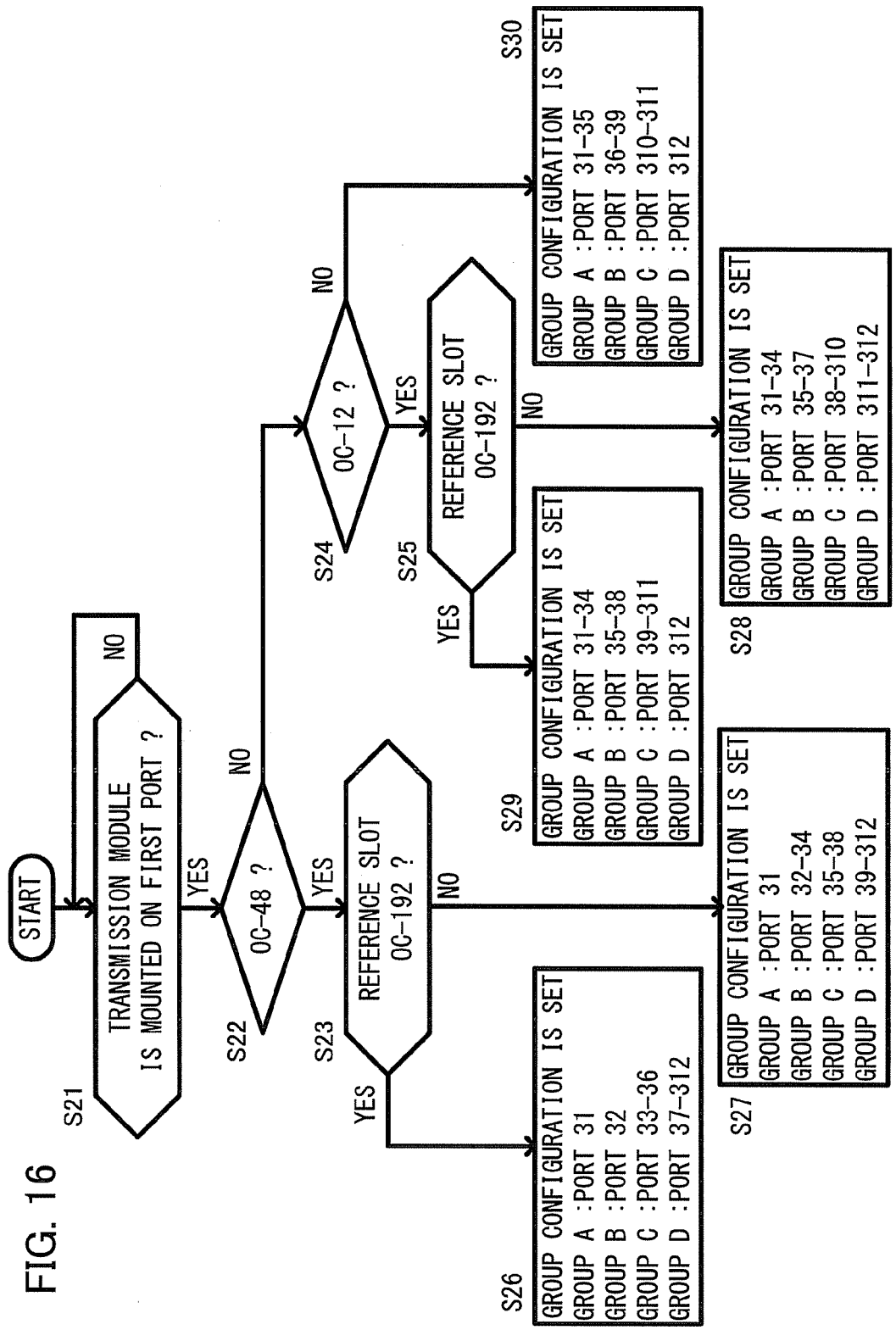
FIG. 16 is a diagram (2) illustrating a setting flow of the group configuration.

FIG. 16 is a diagram (2) illustrating the setting flow of the group configuration. A reference port is provided in advance in the ports 30 on the interface board 100, and the group configuration is set on the basis of the type (bit rate) of the transmission module 60 mounted in the reference port. Here, the reference port is referred to as a first port (port 31). The interface board 100 is installed in the reference slot.

S21. The line identifying unit 71, illustrated in FIG. 15, monitors whether or not the transmission module 60 is mounted in the first port on the basis of the information on the physical inventory read out from the transmission module 60. When the transmission module 60 is mounted, Step S22 is carried out.

S22. The line identifying unit 71 determines whether or not the line type of the transmission module 60 mounted in the first port is OC-48 on the basis of the information on the physical inventory read out from the transmission module 60. When it is OC-48, Step S23 is carried out, whereas, when it is not OC-48, Step S24 is carried out.

S23. The line-configuration controller 72 receives from the common board 20 the line information of the interface board 100 installed in the reference slot and determines whether or not the line of the interface board 100 installed in the reference slot is OC-192. When it is OC-192, Step S26 is carried out, whereas when it is not OC-192, Step S27 is carried out.

S24. The line identifying unit 71 determines whether or not the line type of the transmission module 60 mounted in the first port is OC-12 on the basis of the information on the physical inventory read out from the transmission module 60. When it is OC-12, Step S25 is carried out, whereas, when it is not OC-12, Step S30 is carried out.

S25. The line-configuration controller 72 receives from the common board 20 the line information of the interface board 100 installed in the reference slot and determines whether or not the line of the interface board 100 installed in the reference slot is OC-192. When it is not OC-192, Step S28 is carried out, whereas when it is OC-192, Step S29 is carried out.

S26. The line-configuration controller 72, illustrated in FIG. 15, determines on the basis of the information sent from the line identifying unit 71, that the line accommodated in the transmission module mounted in the first port is OC-48, and the interface board mounted in the reference slot accommodates the OC-192 lines. Consequently, the line-configuration controller 72 selects the Type 1 group configuration and controls the line switch 41, as illustrated in FIG. 6, such as to connect the signals via the port 31 to the signal processor 51, to connect the signals via the port 32 to the signal processor 52, to connect the signals via the ports 33 to 36 to the signal processor 53, and to connect the signals via the ports 37 to 312 to the signal processor 54.

In Step S26, the line-configuration controller 72 controls the signal processor 50, as illustrated in FIG. 12, on the basis of the information of the type of the transmission module mounted in each port sent from the line identifying unit 71 such as to connect the signals via the ports to the signal processing circuits corresponding to the bit rate.

S27. The line-configuration controller 72 determines on the basis of the information sent from the line identifying unit 71, that the line accommodated in the transmission module mounted in the first port is OC-48, and the interface board mounted in the reference slot does not accommodate the OC-192 lines; therefore, Group B of the Type 1 group configuration is set to a group configuration to which many ports being. The line-configuration controller 72 controls the line switch 41, such as to connect the signals via the port 31 to the signal processor 51, to connect the signals via the ports 32 to 34 to the signal processor 52, to connect the signals via the ports 35 to 38 to the signal processor 53, and to connect the signals via the ports 39 to 312 to the signal processor 54.

In Step S27, the line-configuration controller 72 controls the signal processor 50, as illustrated in FIG. 12, on the basis of the information (bit rate) of the type of the transmission module mounted in each port sent from the line identifying unit 71 such as to connect the signals via the ports to the signal processing circuits corresponding to the bit rate.

S28. The line-configuration controller 72 determines on the basis of the information sent from the line identifying unit 71, that the line accommodated in the transmission module mounted in the first port is OC-12, and the interface board mounted in the reference slot does not accommodate the lines OC-192. Consequently, the line-configuration controller 72 selects the Type 2 group configuration and controls the line switch 41, as illustrated in FIG. 8, such as to connect the signals via the ports 31 to 34 to the signal processor 51, to connect the signals via the ports 35 to 37 to the signal processor 52, to connect the signals via the ports 38 to 310 to the signal processor 53, and to connect the signals via the ports 311 and 312 to the signal processor 54.

In Step S28, the line-configuration controller 72 controls the signal processor 50, as illustrated in FIG. 12, on the basis of the information (bit rate) of the type of the transmission module mounted in each port sent from the line identifying unit 71 such as to connect the signals via the ports to the signal processing circuits corresponding to the bit rate.

S29. The line-configuration controller 72 determines on the basis of the information sent from the line identifying unit 71, that the line accommodated in the transmission module mounted in the port 31 is OC-12, and the interface board mounted in the reference slot accommodates the lines OC-192; therefore, sets a group configuration in which many ports belong to Group B of the Type 2 group configuration. The line-configuration controller 72 controls the line switch 41 such as to connect the signals via the ports 31 to 34 to the signal processor 51, to connect the signals via the ports 35 to 38 to the signal processor 52, to connect the signals via the ports 39 to 311 to the signal processor 53, and to connect the signals via the port 312 to the signal processor 54.

In Step S29, the line-configuration controller 72 controls the signal processor 50, as illustrated in FIG. 12, on the basis of the information (bit rate) of the type of the transmission module mounted in each port sent from the line identifying unit 71 such as to connect the signals via the ports to the signal processing circuits corresponding to the bit rate.

S30. The line-configuration controller 72 determines that the line accommodated in the transmission module mounted in the port 31 is OC-3 on the basis of the information sent from the line identifying unit 71. Consequently, the line-configuration controller 72 selects the Type 3 group configuration and controls the line switch 41, as illustrated in FIG. 10, such as to connect the signals via the ports 31 to 35 to the signal processor 51, to connect the signals via the ports 36 to 39 to the signal processor 52, to connect the signals via the ports 310 and 311 to the signal processor 53, and to connect the signals via the port 312 to the signal processor 54.

In Step S30, the line-configuration controller 72 controls the signal processor 50, as illustrated in FIG. 12, on the basis of the information of the type of the transmission module mounted in each port sent from the line identifying unit 71 such as to connect the signals via the ports to the signal processing circuits corresponding to the bit rate.

According to this embodiment, it is possible to accommodate lines of different types in one port, and it is possible to set the group configuration to which the port belongs according to the type (bit rate) of the lines accommodated in the reference port among the ports provided on the interface board and the type of the lines accommodated in the interface board mounted in the reference slot of the multirate communication apparatus. Consequently, the line capacity processed at the interface board may be improved.

In the above-described embodiment, the number of ports (for example, 12) provided on the interface board, a first line capacity (for example, equivalent to STS-192) accommodated and processed in the interface board, the number of groups (for example, four) that process the line signals of a second line capacity (for example, equivalent to STS-48) obtained by dividing the first line capacity, the number of ports belonging to each group, an the line (for example, OC-192) accommodate in the interface board mounted in the reference slot are determined by the size of the circuits installed on the interface board, the signal processing architecture (interface condition between the interface board and the common board, etc.) of the multirate communication apparatus accommodating the interface board. It is possible, however, to apply the above-described multirate communication apparatus and the method of controlling the line-configuration of the multirate communication apparatus.

Third Embodiment

In FIG. 2, by providing a signal processing circuits of Ethernet and Ethernet over SONET (EoS) circuits that expand Ethernet signals on a SONET signal format in the signal processors 51 to 54, the interface board 100 installs a transmission module of Ethernet in the transmission module 60, and it is possible to process the Ethernet signals. The signal processors provided with such EoS circuits are represented as signal processors 81 to 84 (illustrated in FIGS. 18 and 19).

Figure 17:
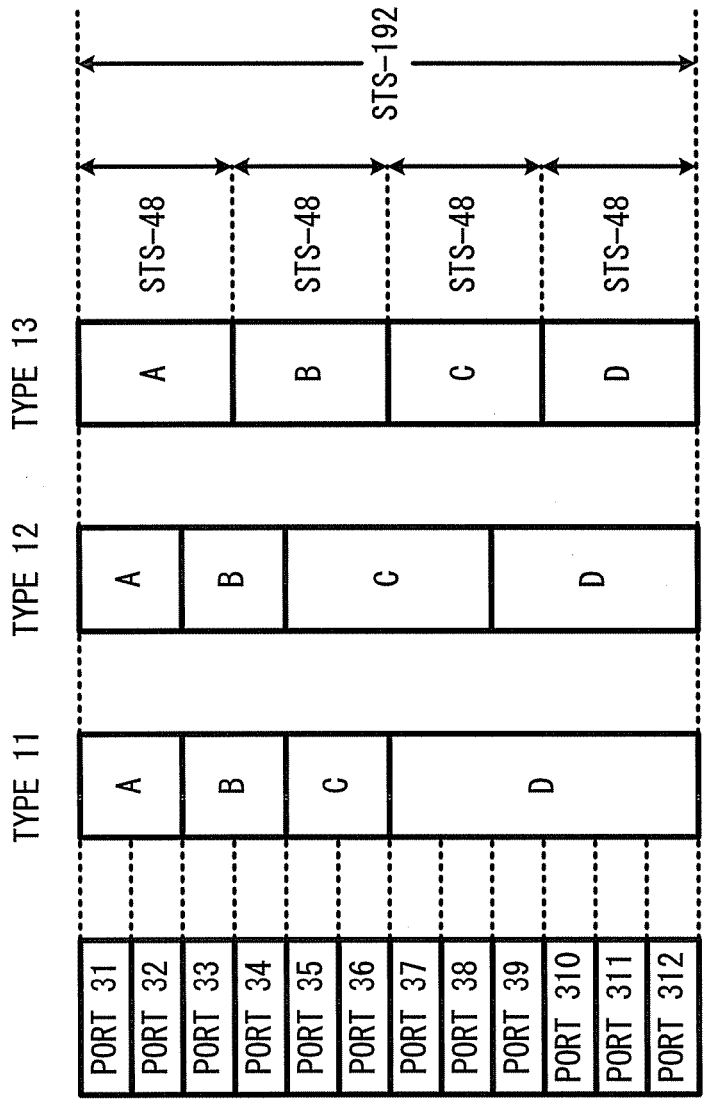
FIG. 17 is a diagram (2) illustrating group configuration.

FIG. 17 is a diagram (2) illustrating a group configuration of the interface board 100 that processes the Ethernet signals.

For example, the interface board 100 includes 12 ports 31 to 312 and carries out the processing of the line signals of STS-192 at four groups (Groups A to D) with processing of the line signals equivalent to STS-48 at each of the signal processors. This condition is the same as that illustrated in FIG. 3.

Type 11 processes the signals of ports 31 and 32, ports 33 and 34, ports 35 and 36, and ports 37 to 312 at Groups A, B, C, and D, respectively.

Type 12 processes the signals of ports 31 and 32, ports 33 and 34, ports 35 to 38, and ports 39 to 312 at Groups A, B, C, and D, respectively.

Type 13 processes the signals of ports 31 to 33, ports 34 to 36, ports 37 to 39, and ports 310 to 312 at Groups A, B, C, and D, respectively.

Figure 18:
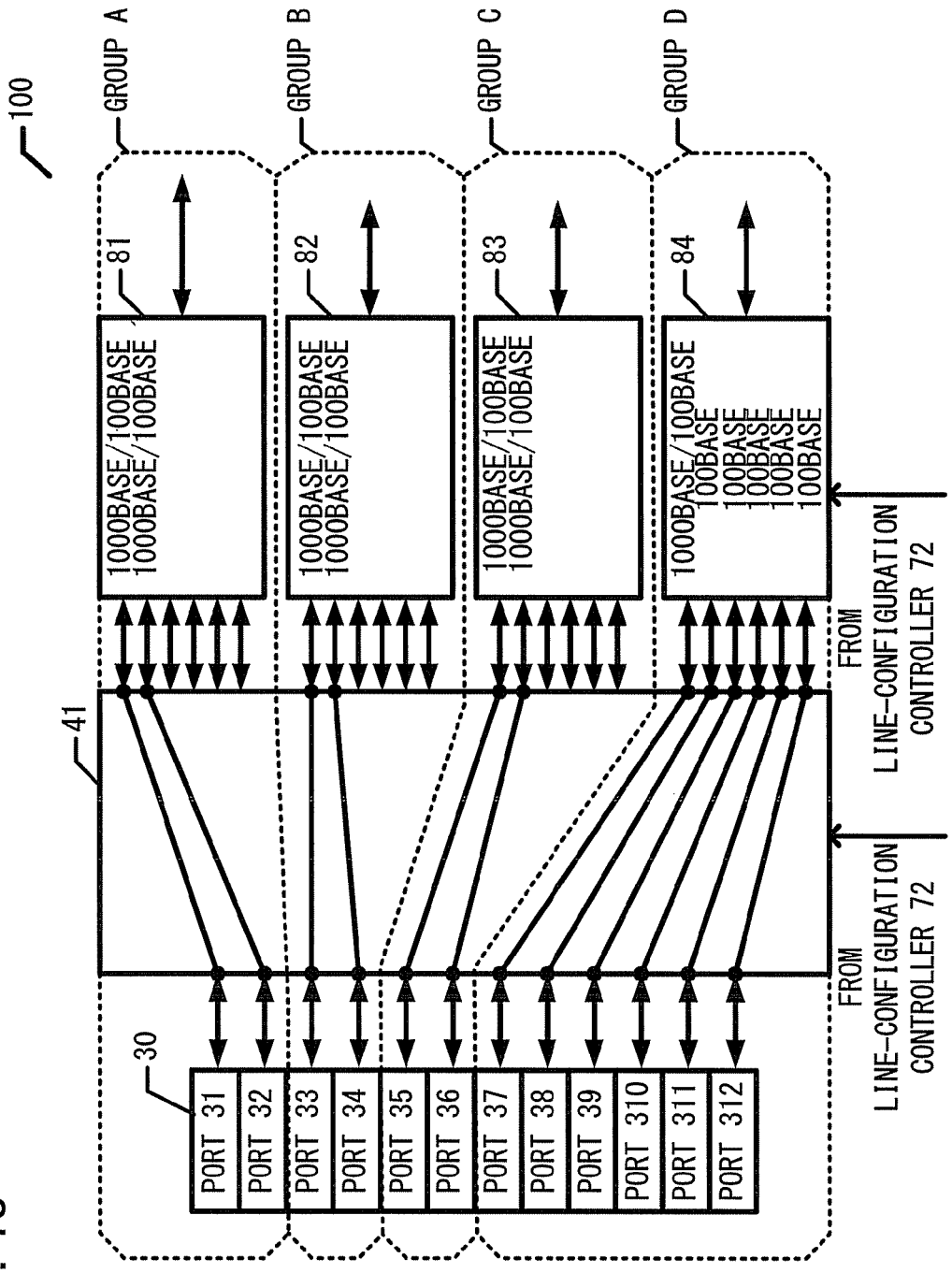
FIG. 18 is a diagram illustrating, in outline, a Type 11 group configuration.

FIG. 18 is a diagram illustrating, in outline, Type 11 group configuration in the interface board 100 that processes the Ethernet signals. The line switch 41 is controlled such that the signals via the ports 31 and 32 are connected to the signal processor 81, the signals via the ports 33 and 34 are connected to the signal processor 82, the signals via the ports 35 and 36 are connected to the signal processor 83, and the ports 37 to 312 are connected to the signal processor 84.

The signal processors 81 to 83 are each provided with a signal processing circuit that is capable of processing the signals of either 1000BASE or 100BASE; and the signal processor 84 is provided with a signal processing circuit that is capable of processing the signals of either 1000BASE or 100BASE and a signal processing circuit that is capable of processing the signals of 100BASE. Here, a signal processing circuit that is capable of processing the signals of 100BASE is also capable of processing the signals of 10BASE.

Figure 19:
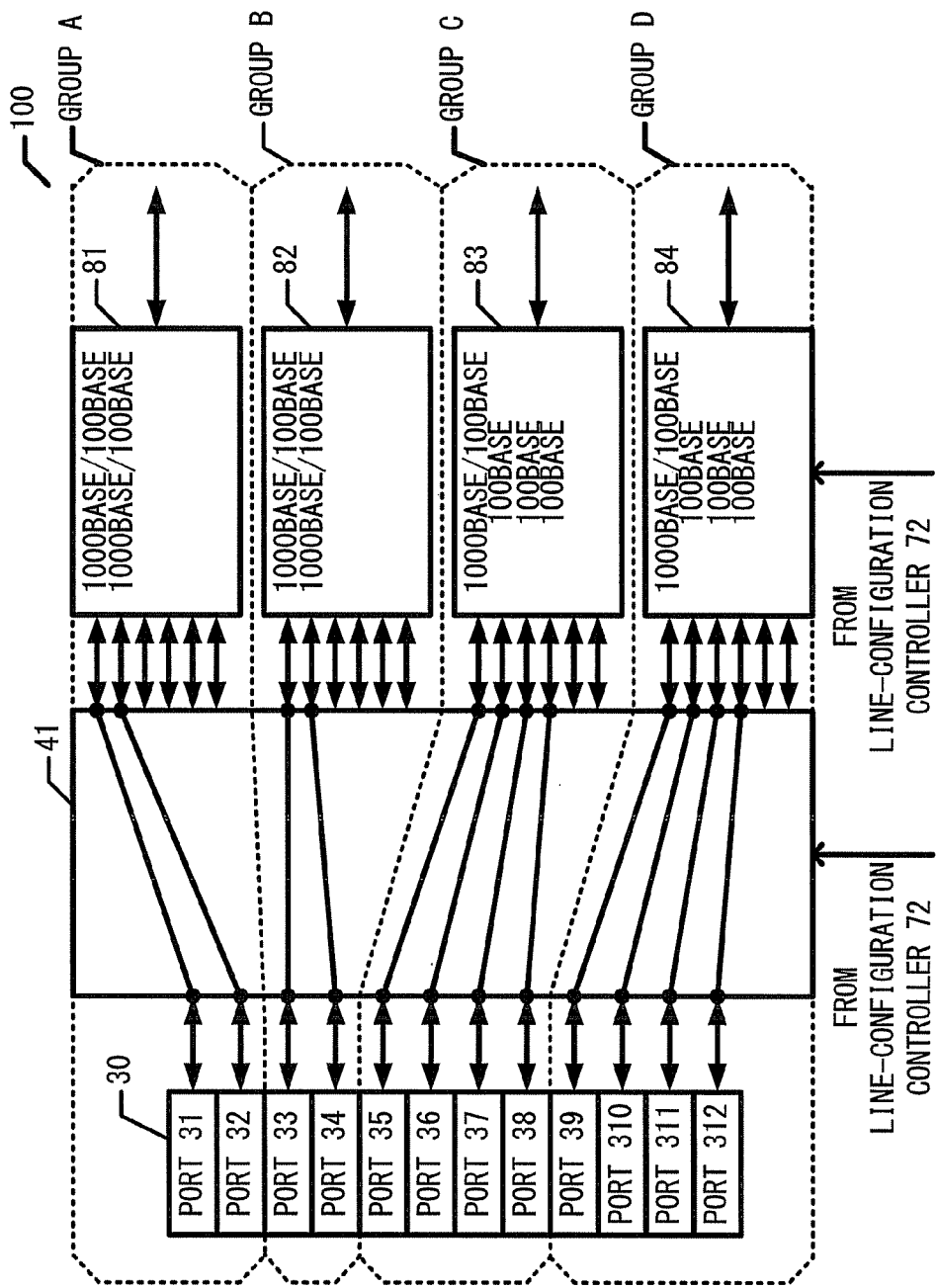
FIG. 19 is a diagram illustrating, in outline, a Type 12 group configuration.

FIG. 19 is a diagram illustrating, in outline, Type 12 group configuration in the interface board 100 that processes the Ethernet signals. The line switch 41 is controlled such that the signals via the ports 31 and 32 are connected to the signal processor 81, the signals via the ports 33 and 34 are connected to the signal processor 82, the signals via the ports 35 to 38 are connected to the signal processor 83, and the ports 39 to 312 are connected to the signal processor 84.

The signal processors 81 and 82 are each provided with a signal processing circuit that is capable of processing the signals of either 1000BASE or 100BASE; and the signal processors 83 and 84 are each provided with a signal processing circuit that is capable of processing the signals of either 1000BASE or 100BASE and a signal processing circuit that is capable of processing the signals of 100BASE. Here, a signal processing circuit that is capable of processing the signals of 100BASE is also capable of processing the signals of 10BASE.

Figure 20:
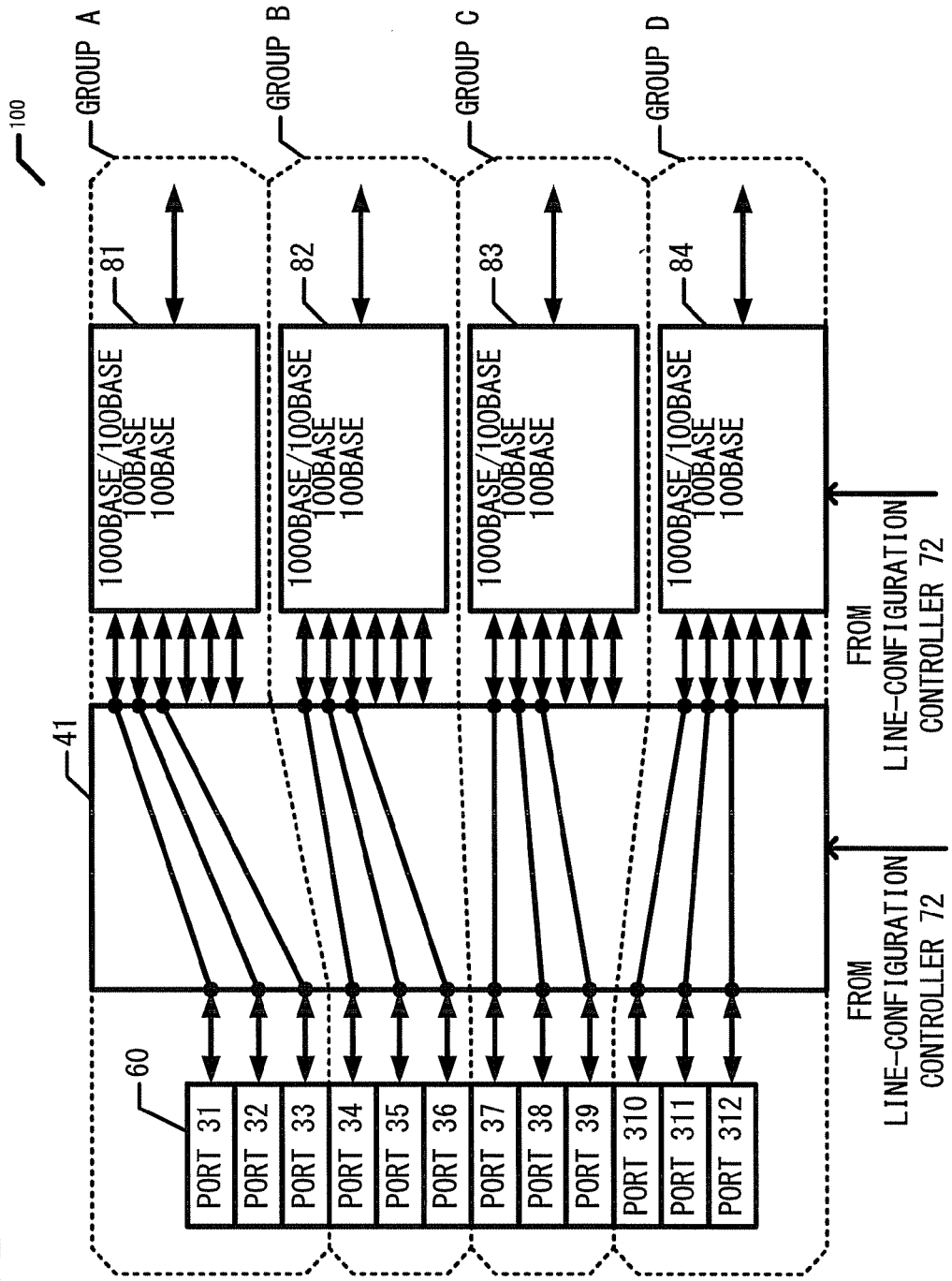
FIG. 20 is a diagram illustrating, in outline, a Type 13 group configuration.

FIG. 20 is a diagram illustrating, in outline, Type 13 group configuration in the interface board 100 that processes the Ethernet signals. The line switch 41 is controlled such that the signals via the ports 31 to 33 are connected to the signal processor 81, the signals via the ports 34 to 36 are connected to the signal processor 82, the signals via the ports 37 to 39 are connected to the signal processor 83, and the ports 310 to 312 are connected to the signal processor 84.

The signal processors 81 to 84 are each provided with a signal processing circuit that is capable of processing the signals of either 1000BASE or 100BASE and a signal processing circuit that is capable of processing the signals of 100BASE. Here, a signal processing circuit that is capable of processing the signals of 100BASE is also capable of processing the signals of 10BASE.

According to this embodiment, for the interface board that processes Ethernet signals, it is possible to accommodate lines of different bit rates in one port according to a flow chart (not shown) similar to the flow chart illustrated in FIG. 4 in the first embodiment. It is possible to set the group configuration to which the port belongs to according to the type (bit rate) of the lines accommodated in the reference port among the ports provided on the interface board. Consequently, the line capacity processed at the interface board may be improved.

In the above-described embodiment, the number of ports (for example, 12) provided on the interface board, a first line capacity (for example, equivalent to STS-192) accommodated and processed in the interface board, the number of groups (for example, four) that process the line signals of a second line capacity (for example, equivalent to STS-48) obtained by dividing the first line capacity, the number ports belonging to each port are determined by the size of the circuits installed on the interface board, the signal processing architecture (interface condition between the interface board and the common board, etc.) of the multirate communication apparatus accommodating the interface board. It is possible, however, to apply the above-described multirate communication apparatus and the method of controlling the line-configuration of the multirate communication apparatus.

In the above-described embodiments, since it is possible to provide control so that line signals are processed in accordance with the line type of the transmission module mounted on the interface board, it is possible to accommodate lines of different bit rates in one port, and also it is possible to control the configuration of the lines accommodated in the interface board in accordance with the bit rate of the lines accommodated. Therefore, it is possible to improve the accommodation efficiency of the lines processed at the interface board.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A multirate communication apparatus comprising:
   an interface board to connect with a plurality of lines of different bit rates, the interface board having a first line capacity;
   a port to mount a transmission module;
   a line identifying unit to identify a line type of the transmission module mounted in the port, to thereby provide an identification result;
   signal processors to process transmission signals of the plurality of lines, each of the signal processors having a second line capacity obtained by dividing the first line capacity by a predetermined number; and
   a line-configuration controller to control a configuration of lines of the plurality of lines to be processed in a respective signal processor of the signal processors, based on the identification result;
   wherein the respective signal processor processes transmission signals of the configuration of lines controlled by the line-configuration controller to be processed in the respective signal processor, in accordance with the line type of the transmission module mounted in the port.

2. The multirate communication apparatus according to claim 1, further comprising:
   a line switch to control connection of the transmission signals of the plurality of lines as received by the interface board and the respective signal processor, based on the control by the line-configuration controller.

3. The multirate communication apparatus according to claim 1, further comprising:
   a plurality of ports, said port to mount the transmission module being a reference port of the plurality of ports.

4. The multirate communication apparatus according to claim 1, further comprising:
   a plurality of ports, said port to mount the transmission module being a predetermined reference port, and
   the interface board is mounted in a predetermined reference slot,
   wherein the line-configuration controller controls the configuration of lines to be processed in respective signal processor, based on
     the identification result, and
     a type of the interface board due to the interface board being mounted in the predetermined reference slot.

5. The multirate communication apparatus according to claim 1, wherein the first line capacity has a capacity capable of transmitting synchronous transport signal-192 (STS-192) and the second line capacity has a capacity capable of transmitting STS-48.

6. The multirate communication apparatus according to claim 1, wherein STS-48, STS-12, and STS-3 are processed in the respective signal processor.

7. The multirate communication apparatus according to claim 1, wherein the respective signal processor includes signal processing circuits corresponding to a plurality of line types and selects a respective signal processing circuit of the signal processing circuits based on the identification result.

8. A method of controlling a line-configuration of a multirate communication apparatus including an interface board having a first line capacity and configured to connect with a plurality of lines of different bit rates, and signal processors to process transmission signals of the plurality of lines, each of the signal processors having a second line capacity obtained by dividing the first line capacity by a predetermined number, the method comprising:
   identifying a line type of a transmission module mounted in a port included in the interface board, to thereby provide an identification result; and
   controlling a configuration of lines of the plurality of lines to be processed in a respective signal processor of the signal processors, based on the identification result.

9. The method according to claim 8, wherein the port is a predetermined reference port of a plurality of ports included in the interface board.

10. The method according to claim 8, further comprising:
   selecting a signal processing circuit of a plurality of signal processing circuits in the respective signal processor, based on the identification result.

11. An apparatus comprising:
   an interface board to connect with a plurality of lines of different bit rates, the interface board having a first line capacity;
   a port to mount a transmission module;
   a line identifying unit to identify a line type of the transmission module mounted in the port, to thereby provide an identification result;
   signal processors to process transmission signals of the plurality of lines, each of the signal processors having a second line capacity that is less than the first line capacity; and
   a line-configuration controller to control configurations of lines of the plurality of lines to be processed in the signal processors, respectively, based on the identification result;
   wherein each respective signal processor of the signal processors processes transmission signals of the respective configuration of lines controlled by the line-configuration controller to be processed in the respective signal processor, in accordance with the line type of the transmission module mounted in the port.

* * * * *

UNITED STATES PATENT AND TRADEMARK OFFICE
CERTIFICATE OF CORRECTION

| | |
|---|---|
| PATENT NO. | : 8,532,131 B2 |
| APPLICATION NO. | : 12/720046 |
| DATED | : September 10, 2013 |
| INVENTOR(S) | : Takashi Honda |

Page 1 of 1

It is certified that error appears in the above-identified patent and that said Letters Patent is hereby corrected as shown below:

Title Page, item [57] Col. 2 (Abstract), Line 11, Delete "respective the" and insert -- the respective --, therefor.

Title Page, item [57] Col. 2 (Abstract), Line 15, Delete "base" and insert -- based --, therefor.

Signed and Sealed this
Twenty-fourth Day of December, 2013

Margaret A. Focarino
*Commissioner for Patents of the United States Patent and Trademark Office*